United States Patent
Abadeer et al.

(10) Patent No.: US 6,249,193 B1
(45) Date of Patent: Jun. 19, 2001

(54) TERMINATION IMPEDANCE INDEPENDENT SYSTEM FOR IMPEDANCE MATCHING IN HIGH SPEED INPUT-OUTPUT CHIP INTERFACING

(75) Inventors: Wagdi W. Abadeer, Jericho; John Connor, Burlington; Patrick R. Hansen, Essex Junction, all of VT (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/320,902

(22) Filed: May 27, 1999

Related U.S. Application Data

(63) Continuation-in-part of application No. 09/255,997, filed on Feb. 23, 1999, now Pat. No. 6,140,885.

(51) Int. Cl.[7] .............................. H03H 7/38; H03H 7/40
(52) U.S. Cl. .............................. 333/17.3; 333/32; 333/33
(58) Field of Search .............................. 333/17.3, 32, 33

(56) References Cited

U.S. PATENT DOCUMENTS 4,492,960 * 1/1985 Hislop .............................. 343/5 DD

OTHER PUBLICATIONS

S. L. Miller et al., "Failure Modes in Surface Micromachined MicroElectroMechanical Actuators," IEEE 98CH36173, 36th Annual International Reliability and Physics Symposium, pp. 17–25 (Reno, Nevada, 1998).

D. M. Tanner et al., The Effect of Frequency of the Lifetime of a Surface Micromachined Microengine Driving a Load, IEEE 98CH36173, 36th Annual International Reliability Physics Symposium, pp. 26–35 (Reno, Nevada, 1998).

E. J. Garcia et al., "Surface Micromachined Microengine," Sensors and Actuators A, vol. 48, pp. 203–(Elsevier Science S.A. 1995).

W. H. Hayt, Jr., "Transmission Lines," *Engineering Electromagnetics,* Chapter 12, pp. 427–456 (McGraw–Hill, 1981).

* cited by examiner

*Primary Examiner*—Robert Pascal
*Assistant Examiner*—Kimberly E Glenn
(74) *Attorney, Agent, or Firm*—Ratner & Prestia; Tiffany L. Towsend, Esq.

(57) ABSTRACT

An impedance matching system and a network for impedance matching at a driver circuit output for high frequency input-output devices. The impedance matching network comprises an adjustable-length transmission line having a length adjusted in proportion to the magnitude of transients on the driver circuit output and an input impedance, which is purely reactive, and is a function of its length. The purpose of the adjustable-length transmission line is to reduce transient voltages by providing a matching impedance for the reactive component of the impedance of the receiver circuit to the driver circuit. In the preferred embodiment, the impedance matching network comprises two parallel conductive lines formed on the system card, shorted by a movable stub, and connected in parallel to the driver circuit. Optionally, the impedance matching network further comprises a control circuit which detects overshoots and undershoots on the driver circuit output and provides a control current proportional to the magnitude of overshoots and undershoots to an electromagnetic adjustment mechanism which provides a linear adjustment to the moveable stub proportional to the control current.

10 Claims, 18 Drawing Sheets

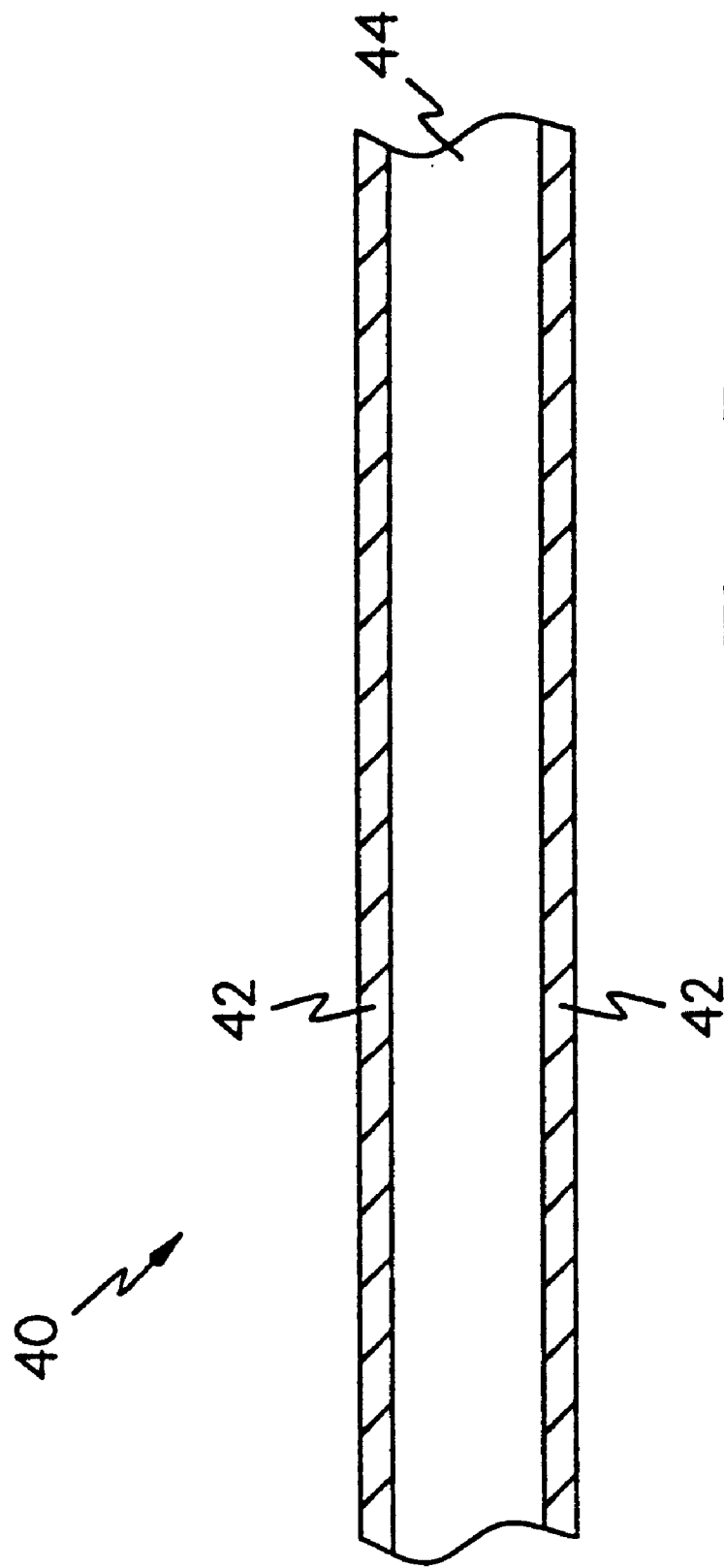

TERMINATION IMPEDANCE INDEPENDENT SYSTEM FOR IMPEDANCE MATCHING IN HIGH SPEED INPUT-OUTPUT CHIP INTERFACING

CROSS REFERENCE TO RELATED APPLICATIONS

The present application is a continuation-in-part of U.S. patent application Ser. No. 09/255,997, filed on Feb. 23, 1999, which was issued as U.S. Pat. No. 6,140,885 on Oct. 31, 2000, and is assigned to the assignee of the subject application.

TECHNICAL FIELD

The present invention relates generally to fabrication of electronic devices and, more particularly, to a system and structure for impedance matching in very high speed input-output (I/O) chip interfacing to improve performance and reliability of I/O chips and systems that contain I/O chips.

BACKGROUND OF INVENTION

One of the most important aspects in integrated chip system design is the interface considerations for very short channel Complementary Metal-Oxide-Semiconductor (CMOS) devices in high-speed applications. Beginning with the driving circuit, an on-chip voltage swing of ground to Vdd (internal power supply) must be communicated off-chip to external devices. The path from the driver output to the output pad involves capacitive coupling effects to other on-chip signals. Moreover, the chip packaging system adds inductances to the circuit. The external signals must then traverse some interconnect (or transmission line), whether card traces or multi-chip module (MCM) connections. The signals are subject to additional deformations at this point due to transmission line effects introduced by the interconnects. The use of external decoupling capacitors to stabilize the card power supply provided to the chip is known in the art. For low-impedance card power plane connections, these external capacitors do not reduce the on-chip simultaneous switching noise of the driver circuit.

Transmission line effects become significant when the round trip propagation delay from the sending chip to the receiving chip is greater than the rise time of the transmitted signal. This condition is almost always met for modern CMOS-based digital systems. When this is the case, reflections occur on the signal line due to impedance mis-matches between the source, the transmission line, and the load. These reflections are superimposed on the transmitted signal, causing significant overshoot, undershoot, and system-wide noise. These conditions can cause both performance problems and reliability problems.

The performance problem is a reduction in the valid-data window of transmitted pulses with respect to the system clock. The reliability problem involves devices with ultra-thin gate dielectric layers, less than 5 nm thickness, for which overshoots and undershoots can have a significant effect in reducing the effective useful life of the thin gate dielectric. This can lead to catastrophic breakdown. The voltage overshoots and undershoots can also cause latch-up in CMOS devices leading to serious reliability problems. For high speed CMOS applications where the data rates are in the range of 1 GHz to 10 GHz and above, these performance and reliability problems can cause severe design limitations and prove costly.

The deficiencies of conventional, high-speed input-output interfaces show that a need exists for improvement. To overcome the shortcomings of conventional systems, a new system and structure for impedance matching in high-speed input-output chip interfacing is provided. It is an object of the present invention to provide a system and structure to achieve impedance matching at a driver circuit output, thereby preventing and not merely compensating for high voltage transients (overshoots) and low voltage transients (undershoots). It is another object of the present invention to provide a system and structure which can be manually adjusted to provide impedance matching at a driver circuit output during system set-up. It is yet another object of the present invention to provide an economical and manufacturable system and structure which can be manually adjusted to provide impedance matching at a driver circuit output for actual operating conditions of a specific system.

It is still another object of the present invention to provide a system and structure capable of automatically adjusting to provide impedance matching at a driver circuit output when operating conditions cause changes to the system.. Another object of the present invention is to provide a control circuit for an impedance matching system which detects overshoots and undershoots on the driver circuit output and automatically provides a control voltage to an adjustment mechanism to adjust the length of an adjustable-length transmission line providing impedance matching based on actual overshoots and undershoots. Still another object of the present invention is to provide an impedance matching system capable of performing its functions under a wide range of values for the various components comprising both the on-chip driver circuit and the off-chip interface circuitry.

SUMMARY OF THE INVENTION

To achieve these and other objects, and in view of its purposes, the present invention provides a process and structure for an impedance matching network. The structure includes an adjustable-length transmission line located between the driver circuit and the receiver circuit (load) on the system printed circuit board (card). The adjustable-length transmission line is comprised of two conductive stripes connected in parallel with an input-output driver circuit at one end, electrically isolated at the opposite end, and short circuited by a movable stub intermediate of the ends. The adjustable length transmission line is located on the system printed circuit board between the driver circuit and the receiver circuit. Optionally, the impedance matching network may further comprise an adjustment mechanism and a control circuit.

The impedances at the driver circuit output are matched by adjusting the length of the adjustable-length transmission line such that the composite reactance of the load, the transmission line between the driver circuit chip and the load, the connections, and the adjustable-length transmission line equals the converse of the driver reactance. In a first embodiment, the length of the adjustable-length transmission line can be set or adjusted manually at system set-up, such as by a systems engineer or operator. In order to adjust the adjustable-length transmission line, the systems engineer or operator observes the waveform using electronic measuring equipment such as an oscilloscope. The position of the moveable stub is manually adjusted until the magnitude of undershoots and overshoots as viewed on the electronic measuring equipment is minimized.

In a second embodiment, the length of the adjustable-length transmission line is adjusted by the adjustment mechanism. The adjustment mechanism comprises an electromagnetic coil, a moveable magnetic core, and a return spring. The electromagnetic coil creates a magnetic field proportional to a control current from the control circuit. The magnetic field provides a force to the moveable magnetic core acting in a first direction. The return spring provides a force to the moveable magnetic core acting in a second direction opposite to the first direction. The moveable magnetic core is attached to the moveable stub whose position determines the length of the adjustable-length transmission line.

The control circuit generates a control current which varies in response to high and low transient voltages on the driver circuit output. In the second embodiment, the control circuit comprises a positive detect circuitry and a negative detect circuitry, each of which provides a high (up) pulse to a counter when triggered by a transient, and a CLK down generator which provides a low (down) pulse to the counter as a function of the system clock. Both the positive detect circuitry and the negative detect circuitry are self-resetting.

In the second embodiment, the control circuit further comprises a quantity of "n" N-type field effect transistors connected in parallel between the adjustment mechanism of the adjustable length transmission line and the system ground. The transistors have control gates connected to an n-bit counter which is incrementally increased by the positive detect circuitry when an overshoot occurs on the driver circuit output and by the negative detect circuitry when an undershoot occurs on the driver circuit output. Thus, the number of transistors drawing current and the resulting control current are adjusted until no transients are occurring on the driver circuit output.

The present invention provides considerable improvement over the prior art. Whereas the prior art has been directed toward compensating for transient voltages using approaches such as isolation rings, forward biasing, excess dielectric, and decoupling capacitors on the system card, the present invention is directed to preventing voltage transients on the driver circuit output by impedance matching. The present invention can be economically fabricated and implemented using current process technologies and existing input-output semiconductor devices. In addition, by adjusting the length of the adjustable-length transmission line based on the magnitude of the transients in a particular system, the present invention can operate in systems having a wide range of operating conditions and in systems having varying operating conditions. For instance, when operating conditions change dynamically during operation, the present invention can automatically adjust the impedance to provide matching. The present invention achieves these benefits in the context of known process technology.

It is to be understood that both the foregoing general description and the following detailed description are exemplary, but are not restrictive, of the invention.

BRIEF DESCRIPTION OF THE DRAWING

The features and advantages of the impedance matching network according to the present invention and further details of the process and structure for such an impedance matching network are best understood from the following detailed description when read in connection with the accompanying drawing. It is emphasized that, according to common practice, the various features of the drawing are not to scale. On the contrary, the dimensions of the various features are arbitrarily expanded or reduced for clarity. Included in the drawing are the following figures:

FIG. 2B illustrates the conductive lines of the transmission line;

DETAILED DESCRIPTION OF THE INVENTION

The present invention will now be described in detail with reference to the accompanying drawing, in which like reference numbers designate similar or corresponding elements, regions, and portions. Several processes of compensating for the overshoots and undershoots caused by impedance mis-match are known in the art. Guard rings, excess dielectric, and forward biasing are some examples of the techniques used to compensate for the transient voltages caused by impedance mis-match. The present invention provides a process for matching the reactive component of the impedance of the load and the transmission line to the impedance of the driver circuit, thereby preventing overshoots and undershoots and their associated performance and reliability problems.

Figure 1:
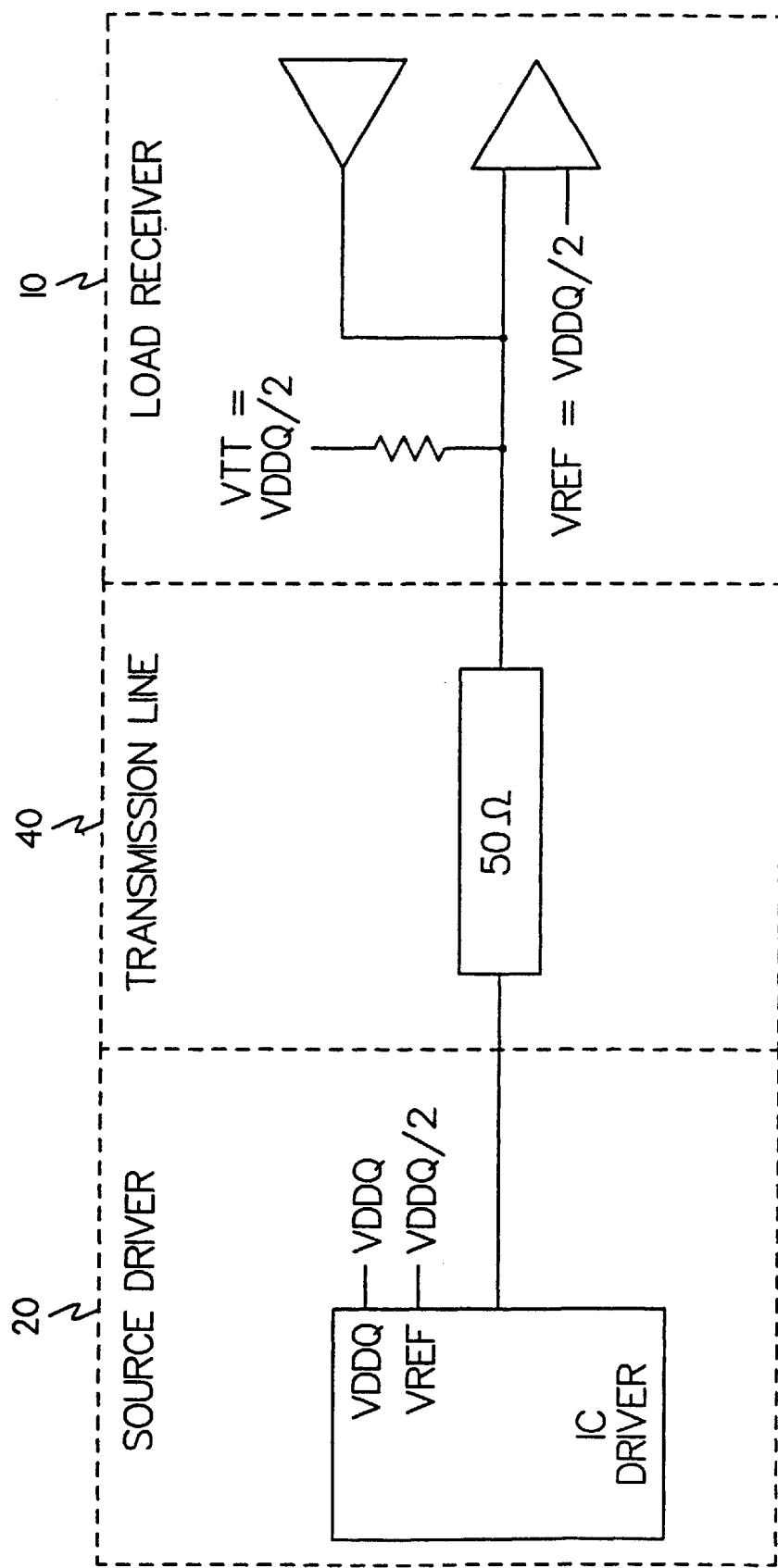
FIG. 1 illustrates a conventional circuit model for a driver circuit, an off-chip receiver circuit, and a transmission line.

FIG. 1 shows a circuit model for a driver circuit (20), an off-chip receiver circuit (10) and a transmission line (40) according to the prior art. When the net reactance at the output of the driver circuit (20) is not zero (impedance mis-match), reflections occur on the signal line. These reflections cause overshoots and undershoots.

Figure 2A:
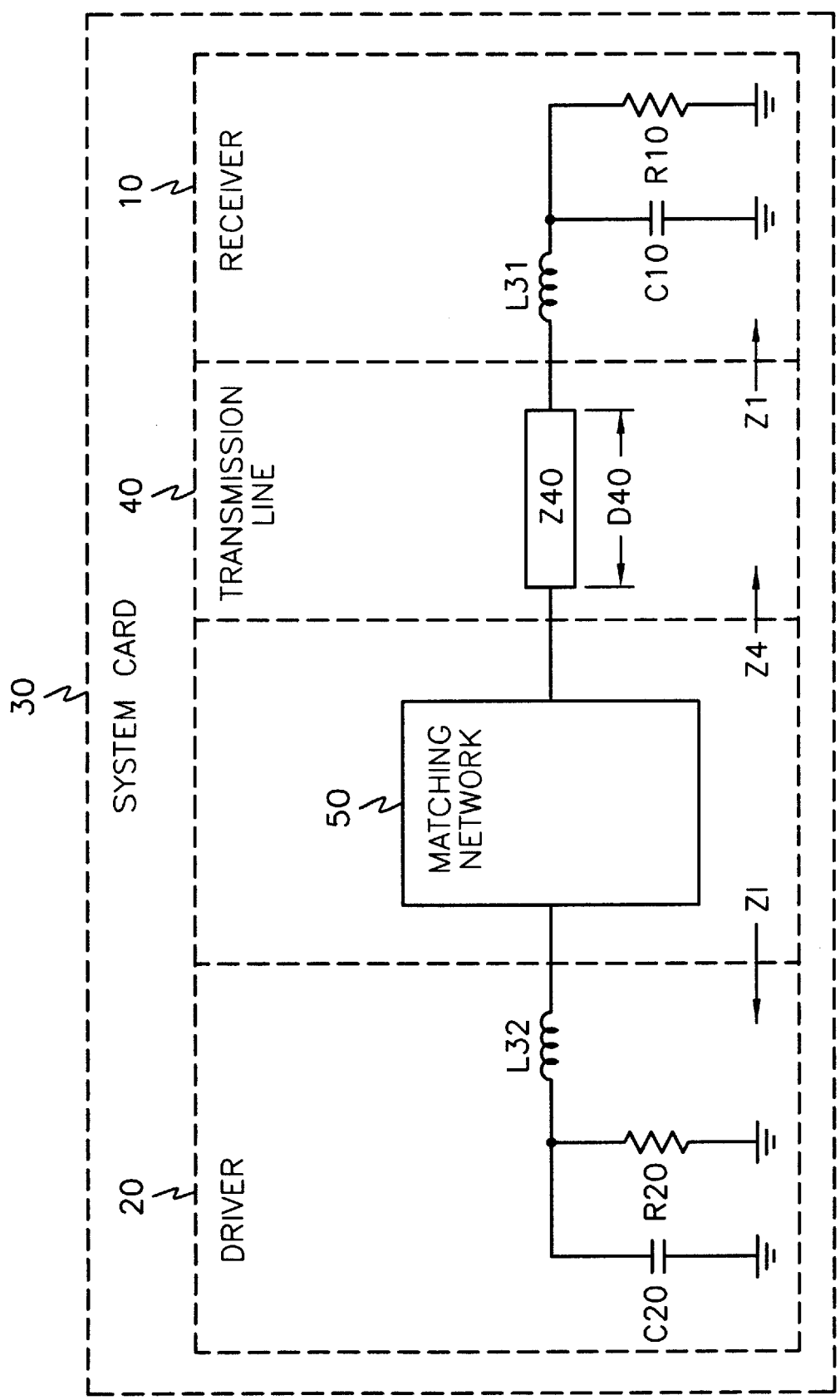
FIG. 2A illustrates a circuit model for the driver circuit, the impedance matching network of the present invention, the transmission line, the off-chip receiver circuit, and connections--showing the impedance matching network as a black box.

FIG. 2A shows a circuit model of the most significant resistive and reactive (e.g., inductive and capacitive) components involved in a system where a driver circuit (20) on one chip is used to supply a signal (voltage) to a receiver circuit (10) on a different chip from the driver circuit. The signal is transmitted from the driver circuit (20) to the receiver circuit (10) on the transmission line (40). An impedance matching network (50), which is the focus of the present invention, is located between the driver circuit (20) and the transmission line (40).

The on-chip driver circuit (20) has a driver resistance (R20) and a driver capacitance (C20). The driver resistance (R20) is typically about 50 ohms. The driver capacitance (C20) is typically about 4.7 pF. As will be shown later, however, the present invention can function with values that differ from the given typical values.

The receiver circuit (10), which is typically not but might be on the same chip as the driver circuit (20), has a receiver resistance (R10) and a receiver capacitance (C10). The receiver resistance (R10) can vary in value depending on the particular system with a typical value being about 50 ohms. It will be demonstrated that the present invention will work independently of the termination resistance of the receiver circuit (10) from a receiver resistance (R10) of 50 ohms to a receiver resistance (R10) approaching the "infinite" resistance of an open circuit. The receiver capacitance (C10) is typically about 3.7 pF.

The connections at the receiver circuit (10) provide a receiver inductance (L31). Chip packaging connections at the driver circuit (20) provide a driver inductance (L32). The receiver inductance (L31) and the driver inductance (L32) are typically each about 2 nH.

As shown in FIG. 2B, the transmission line (40) is composed of printed, conductive stripes (42) of conductive material on a system circuit card (30) with a length (D40) of about 76 mm (3 inches). The stripes (42) are separated by an insulator (44). The dielectric constant ($\epsilon$40) of the insulator (44) between the stripes (42) is typically about 4.5. The relative permeability ($\mu$40) of the insulator (44) is typically about 1. The characteristic impedance (Z40) of the transmission line (40) is typically about 50 ohms.

Unless otherwise specified, all calculations are performed and all graphs are made using the typical values provided above for driver resistance (R20), driver capacitance (C20), receiver resistance (R10), receiver capacitance (C10), driver inductance (L32), receiver inductance (L31), transmission line length (D40), transmission line dielectric constant ($\epsilon$40), transmission line relative permeability ($\mu$40), and transmission line characteristic impedance (Z40). As will be demonstrated later, however, the present invention can provide impedance matching over a wide range for each of these characteristics.

Figure 3A:
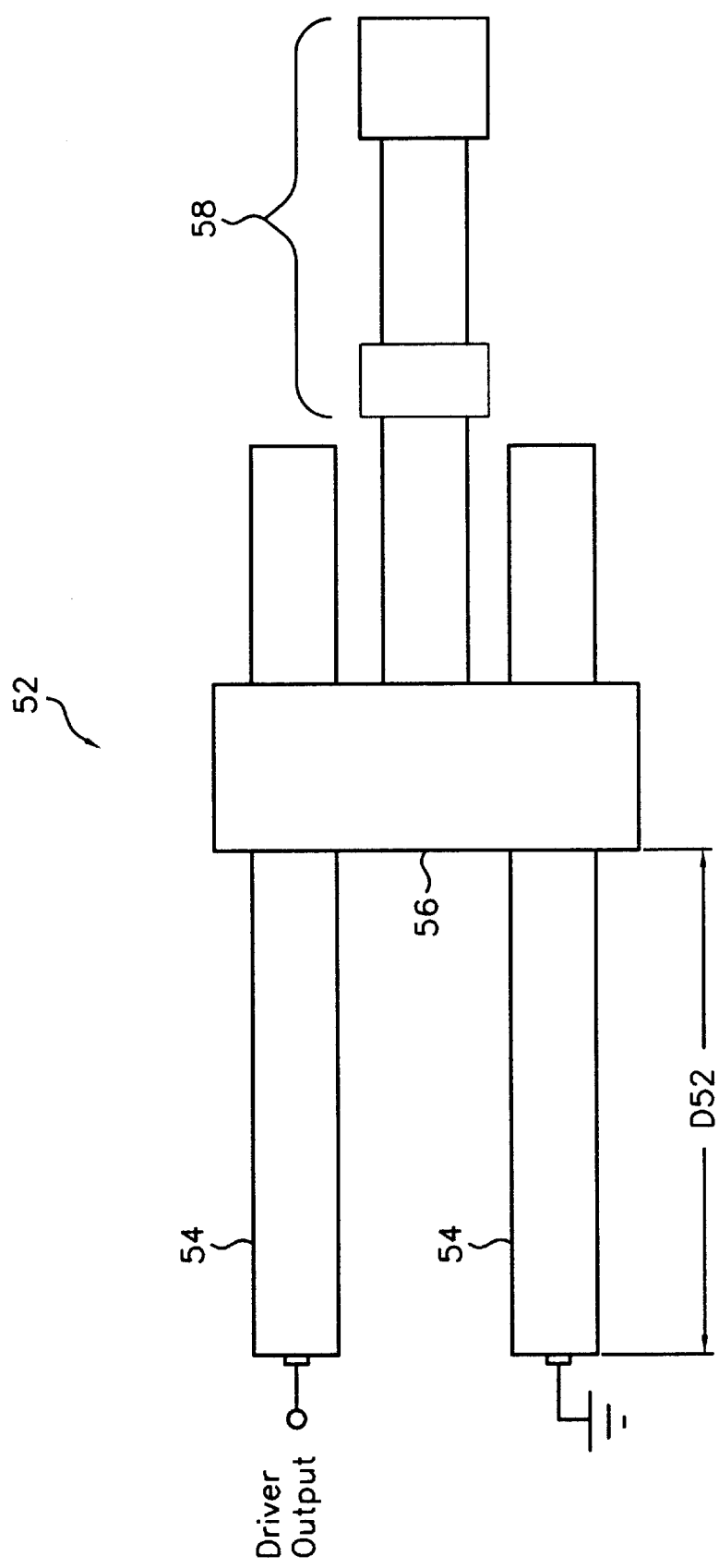
FIG. 3A illustrates the adjustable-length transmission line of the matching network according to the first embodiment of the present invention.

First Embodiment of the Present Invention In a first embodiment, the matching network (50) comprises an adjustable-length transmission line (52) having a variable length (D52). The adjustable-length transmission line (52), as shown in FIG. 3A, comprises two parallel conductive lines (54) (e.g., stripes or circuit traces) located on the system card (30), connected in parallel with an on-chip driver circuit (20) at one end, electrically isolated at the opposite end, and shorted by a movable stub (56) intermediate of the ends of the parallel conductive lines (54). The conductive lines (54) can be composed of a variety of conductive materials, such as aluminum, gold, or most preferably copper. The conductive lines (54) preferably have a width of between about 0.5 inches and one inch, a thickness of between about 400 $\mu$m and 800 $\mu$m, and are preferably spaced apart a distance of between about 0.5 inches and 2 inches.

The movable stub (56) can be composed of a variety of conductive materials, including aluminum, copper, or most preferably stainless steel. The movable stub (56) is preferably formed using conventional micro-machining techniques. The movable stub (56) simultaneously contacts both of the parallel conductive lines (54), and has a thickness of between about 3 mm and 10 mm. The movable stub (56) contacts the parallel conductive lines (54) with a pressure of between about 5 grams and 20 grams.

The movable stub (56) further comprises a mechanism to adjust the position along the length of the parallel conductive lines (54) at which the movable stub (56) contacts the parallel conductive lines (54), thereby changing the length (D52) of the adjustable-length transmission line (52). The position of the movable stub (56) can be adjusted in a number of ways, including but not limited to direct manual manipulation of the movable stub (56) and indirect manipulation of the movable stub (56) through a vernier device (58) as is known in the art. A vernier device is a short, graduated scale that slides along a longer, graduated instrument and is used to indicate fractional parts of divisions, as in a micrometer.

In the preferred process, the movable stub (56) is initially positioned along the length of the parallel conductive lines (54) such that the adjustable-length transmission line (52) is set to its maximum length (shorted as far as possible from the connection of the parallel conductive lines (54) to the output of the driver circuit (20)). The output of the driver circuit (20) is monitored using measuring equipment such as an oscilloscope to determine the magnitude of overshoots and undershoots. If the magnitude of overshoots and undershoots exceeds an acceptable threshold for the system, the position of the movable stub (56) is adjusted incrementally to increase the length (D52) of the adjustable-length transmission line (52). Most preferably, the output of the driver circuit (20) is monitored while the length (D52) of the adjustable-length transmission line (52) is simultaneously adjusted until the magnitude of overshoots and undershoots is within the acceptable threshold. Care must be taken in choosing the monitoring equipment to minimize the impedance-loading effect introduced by the monitoring equipment. The acceptable threshold for overshoot and undershoot magnitude depends upon the particular system based on performance, system set-up, and reliability requirements for the particular system.

Second Embodiment of the Present Invention In a second embodiment, the matching network (50) comprises an adjustable-length transmission line (52) having a variable length (D52), an adjustment mechanism (60), and a control circuit (70). For ease of manufacturing and economic implementation, the matching network is preferably located on the system card (30). This allows for use of existing I/O chips and manufacturing methods for conductive lines and a moveable stub on a system card which are known in the art.

Figure 3B:
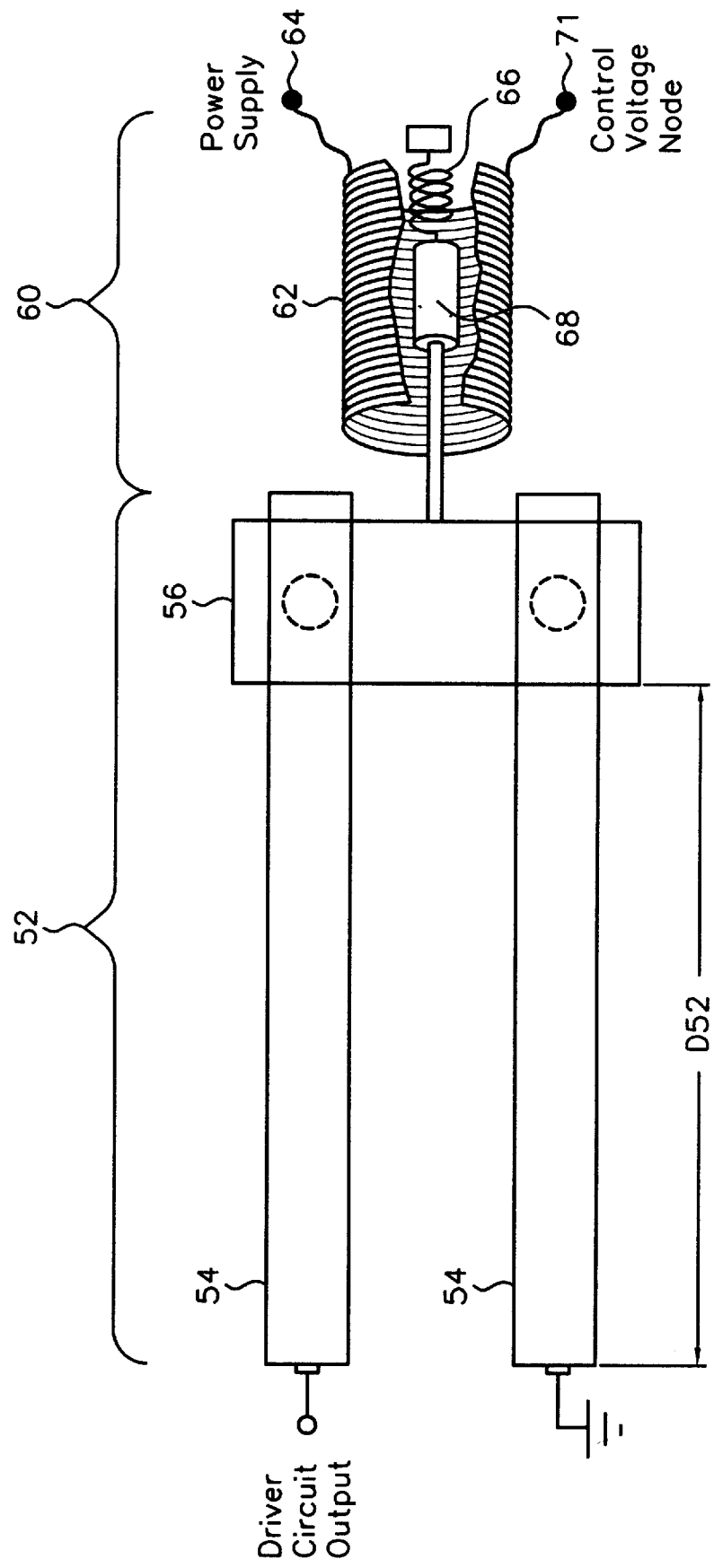
FIG. 3B illustrates the adjustable-length transmission line of the matching network and the adjustment mechanism of the matching network (shown in the relaxed state in which the length of the adjustable-length transmission line is at its maximum) according to a second embodiment of the present invention, in which the magnetic coil is shown cut open to highlight the magnetic core.

As shown in FIG. 3B, the adjustable-length transmission line (52) comprises two parallel conductive lines (54) located on the system card (30), connected in parallel with an on-chip driver circuit (20) at one end, electrically isolated at the opposite end, and shorted by a movable stub (56) intermediate of the two ends of the parallel conductive lines (54). The conductive lines (54) can be composed of a variety of conductive materials, such as aluminum, gold, or most preferably copper. The conductive lines (54) preferably have a width of between about 0.1 and 0.25 inches, a thickness of between about 400 and 800 $\mu$m and are preferably spaced apart a distance of between about 0.1 and 0.25 inches.

The movable stub (56) can be composed of a variety of conductive materials, including aluminum, copper, or most preferably stainless steel. The movable stub (56) is preferably formed using conventional micro-machining techniques. The movable stub (56) simultaneously contacts both of the parallel conductive lines (54) and has a thickness of between about 3 and 10 mm. The movable stub (56) contacts the parallel conductive lines (54) with a pressure of between about 20 and 40 grams/cm$^2$. The moveable stub (56) is attached to a magnetic core (68) which is part of the adjustment mechanism (60).

The adjustment mechanism (60) receives a control current from the control current node (71) of the control circuit (70) causing it to transfer a linear motion to the moveable stub (56). The linear movement of the moveable stub (56) adjusts the length (D52) of the adjustable-length transmission line (52). The adjustment mechanism (60) is located adjacent to the adjustable-length transmission line (52) on the system card (30).

As shown in FIG. 3B, the adjustment mechanism (60) preferably comprises an electromagnetic coil (62) having between 50 and 300 turns and preferably 100 turns of gold, aluminum, or most preferably copper wire. The copper wire preferably has a diameter of between about 0.2 and 0.5 mm. The electromagnetic coil (62) is connected at one end to a power supply (64) and at the other end to the control current node (71) of the control circuit (70). The electromagnetic coil (62) creates a magnetic field that provides a force acting in a first direction on the magnetic core (68) located inside of the electromagnetic coil (62). The magnetic core (68) is attached such that it has only one degree of freedom parallel to the axis of the electromagnetic coil (62). Most preferably, the magnetic force created by the electromagnetic coil (62) acting on the magnetic core (68) causes the length (D52) of the adjustable-length transmission line (52) to decrease. A return spring (66) fixedly attached to the system card (30) on one end and attached to the magnetic core (68) on the opposite end provides a force on the magnetic core (68) acting in a second direction opposite to the first direction.

When the number of energized NFETs (80) increases due to transients on the output of the driver circuit (20), the control current through the electromagnetic coil (62) increases. As the control current through the electromagnetic coil (62) increases, the electromagnetic force acting on the magnetic core (68) increases, causing the magnetic core (68) to move in the first direction, decreasing the length (D52) of the adjustable-length transmission line (52).

When the number of energized NFETs (80) decreases due to the clock down generator (83), the control current through the electromagnetic coil (62) decreases. As the control current through the electromagnetic coil (62) decreases, the return spring (66), which is in tension, causes the magnetic core (68) to move in the second direction, increasing the length (D52) of the adjustable-length transmission line (52).

Figure 6A:
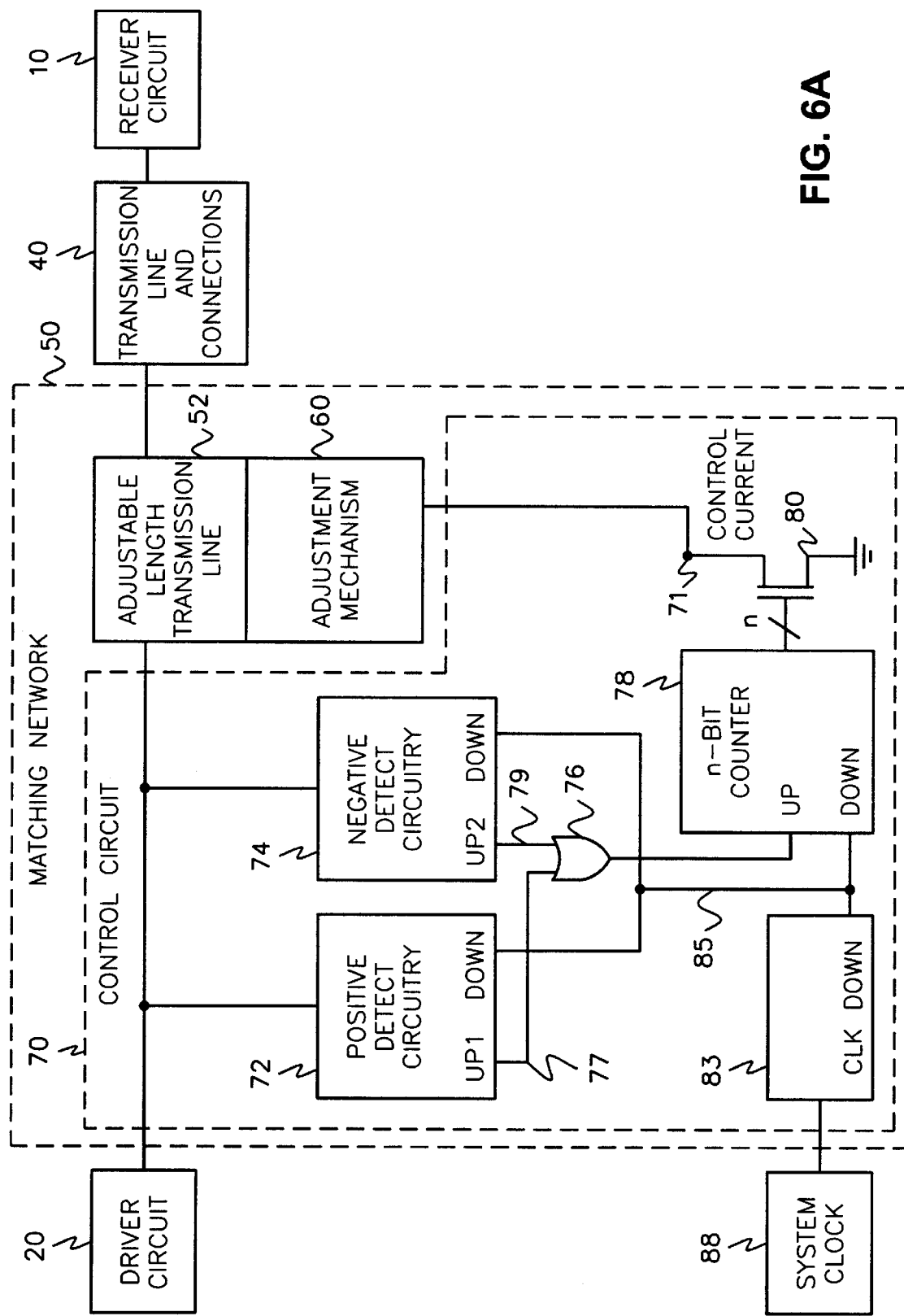
FIG. 6A shows a block diagram of the control circuit according to the second embodiment of the present invention.

Referring to FIG. 6A, the control circuit (70) detects overshoots or (positive) high voltage transients and undershoots or (negative) low voltage transients on the output of the driver circuit (20) and provides a control current in the control current node (71) to the adjustment mechanism (60). The control current in control current node (71) causes the adjustment mechanism (60) to adjust the length (D52) of the adjustable-length transmission line (52), thereby minimizing overshoots and undershoots.

The control circuit (70), as shown in FIG. 6A, comprises positive detect circuitry (72) and negative detect circuitry (74) connected to the output of the driver circuit (20). When an overshoot occurs on the output of the driver circuit (20), the positive detect circuitry (72) detects the overshoot and generates a high pulse at node UP1 (77). When an undershoot occurs on the output of the driver circuit (20), the negative detect circuitry (74) detects the undershoot and generates a high pulse at node UP2 (79).

Nodes UP1 (77) and UP2 (79) are connected to the inputs of an OR gate (76), which is in turn connected at its output to an n-bit counter (78). The n-bit counter (78) is connected at its outputs to the control gates of a quantity "n" N-type field effect transistors or NFETs (80) which are connected in parallel. The quantity "n" is large enough to provide adjustment increments that will meet the overshoot-undershoot threshold established for the system design, preferably between about 4 and 16. A quantity of these NFETs (80) are made active (energized or turned on) equal to the count of the n-bit counter (78). A current is drawn through the NFETs (80) which is proportional to the number of NFETs (80) which are energized. The NFETs (80) are connected to ground at their sources and to the node CONTROL CURRENT (71) at their drains. The node CONTROL CURRENT (71) is connected to the adjustment mechanism.

The control current at the node CONTROL CURRENT (71) is determined by the total currents in the "n" NFETs which are energized. The node CONTROL CURRENT (71) is connected to the adjustment mechanism (60), providing the control current to the adjustment mechanism (60).

A down signal is periodically generated by the CLK down generator (83) on the node DOWN (85) as a function of the system clock (88). The down signal causes the n-bit counter (78) to count down, thereby reducing by one the quantity of NFETs (80) which are energized. The periodic down signal prevents the impedance matching network from being overadjusted because of impedance changes due to dynamic environmental conditions such as temperature.

Figure 6B:
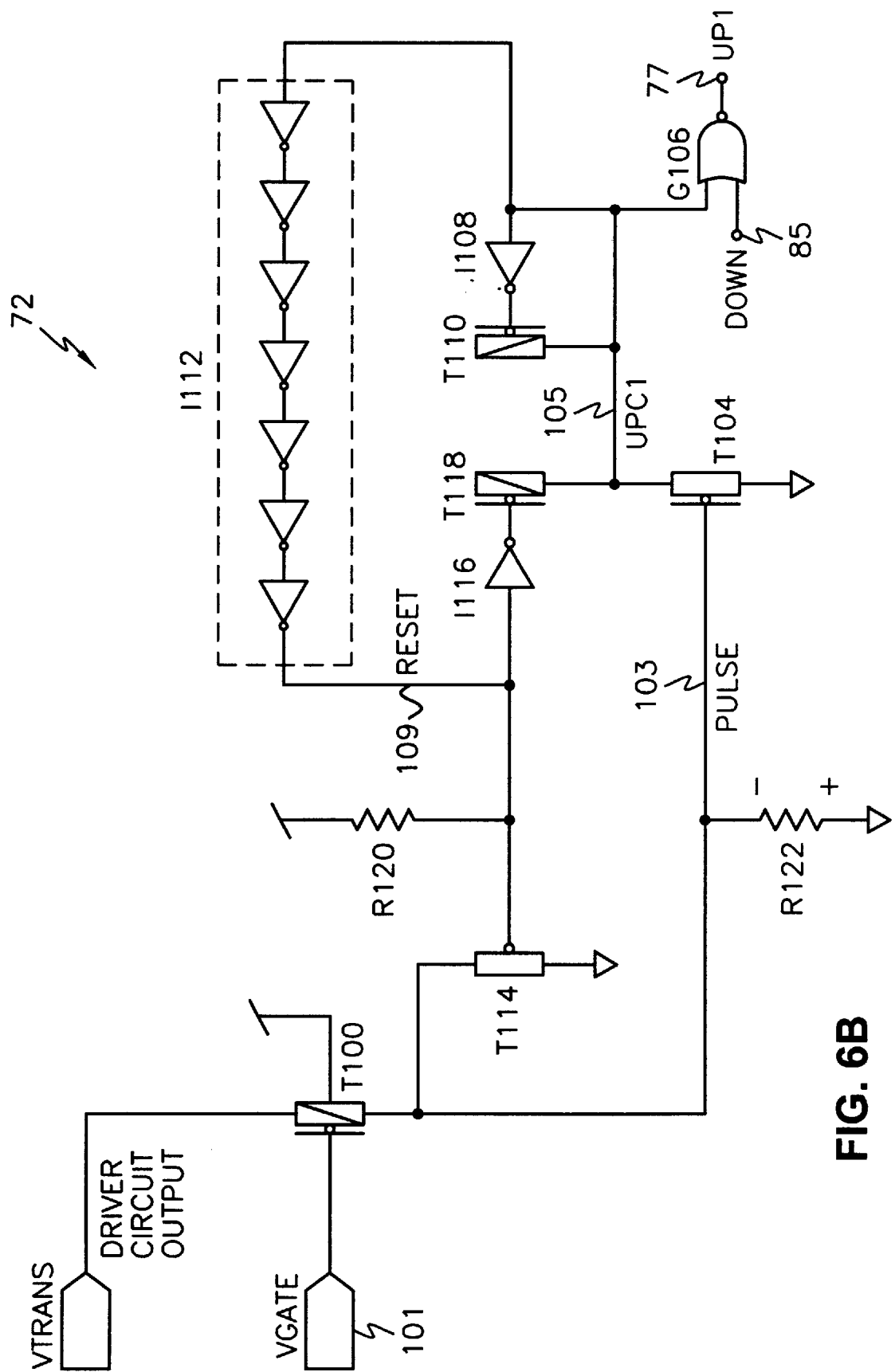
FIG. 6B shows a schematic of the positive detect circuit according to the second embodiment of the present invention.

When a positive transient or overshoot occurs on the output of the driver circuit (20), the positive detect circuitry (72) generates a high pulse at node UP1 (77). The positive detect circuitry (72) is preferably implemented as shown in FIG. 6B. A pulse up transistor (T100), which is an N-well PFET, is connected to the driver circuit power supply (101) at its body and to a high reference potential, typically the driver circuit power supply (101), at its control gate (VGATE). The pulse up transistor (T100) is connected to the output of the driver circuit (20) at its source and to node PULSE (103) at its drain. When a positive transient occurs on the output of the driver circuit (20), the pulse up transistor (T100) switches the node PULSE (103) from low to high. An up interrogate transistor (T104), which is an NFET, is connected to the node PULSE (103) at its control gate, to ground at its source, and to node UPC1 (105) at its drain. When node PULSE (103) switches to high, the up interrogate transistor (T104) switches node UPC1 (105) from high to low.

Nodes UPC1 (105) and DOWN (85) are connected to the inputs of a NOR gate (G106) which generates an up (high) pulse on node UP1 (77) when node UPC1 (105) is low due to a high transient, provided node DOWN (85) has not been switched to a high level by the CLK down generator (83). Node UPC1 (105) is also connected to a voltage keeper comprising an inverter (I108) connected to the control gate of a PFET keeper transistor (T110). The source of the keeper transistor (T110) is connected to internal power and the drain is connected to node UPC1 (105) such that node UPC1 (105) is held at a high state until interrogation by the up interrogate transistor (T104) can occur, thereby preventing accidental tripping by system noise.

Node UPC1 (105) is also connected to a reset loop comprising an odd number of reset delay inverters (I112) connected in series. The last reset delay inverter (I112) is connected to node RESET (109). The number of reset delay inverters (I112) is sufficient to cause a delay longer than the duration of the transient. Experimental modeling has shown that seven reset delay inverters (I112) are typically sufficient. When node UPC1 (105) switches to low, the reset loop switches node RESET (109) from low to high. The node RESET (109) is connected to the control gate of a pulse reset transistor (T114), which is an NFET connected to ground at its source and to node PULSE (103) at its drain. When node RESET (109) switches to high, the pulse reset transistor (T114) switches node PULSE (103) back to its original state of low.

Node RESET (109) is also connected to a UPC1 reset inverter (I116), which is in turn connected to the control gate of a UPC1 reset transistor (T118). The UPC1 reset transistor (T118) is a PFET connected to internal power at its source and to node UPC1 (105) at its drain. When node RESET (109) switches to high, the UPC1 reset transistor (T118) switches node UPC1 (105) back to its original state of high.

A first optional isolating resistive device (R120) can be connected between internal power and node RESET (109) to prevent accidental switching due to coupling to external signals or system noise. Likewise, a second optional isolating resistive device (R122) can be connected between ground and node PULSE (103). The isolating resistive devices (R120, R122) can be resistors or resistively connected FETs.

Figure 6C:
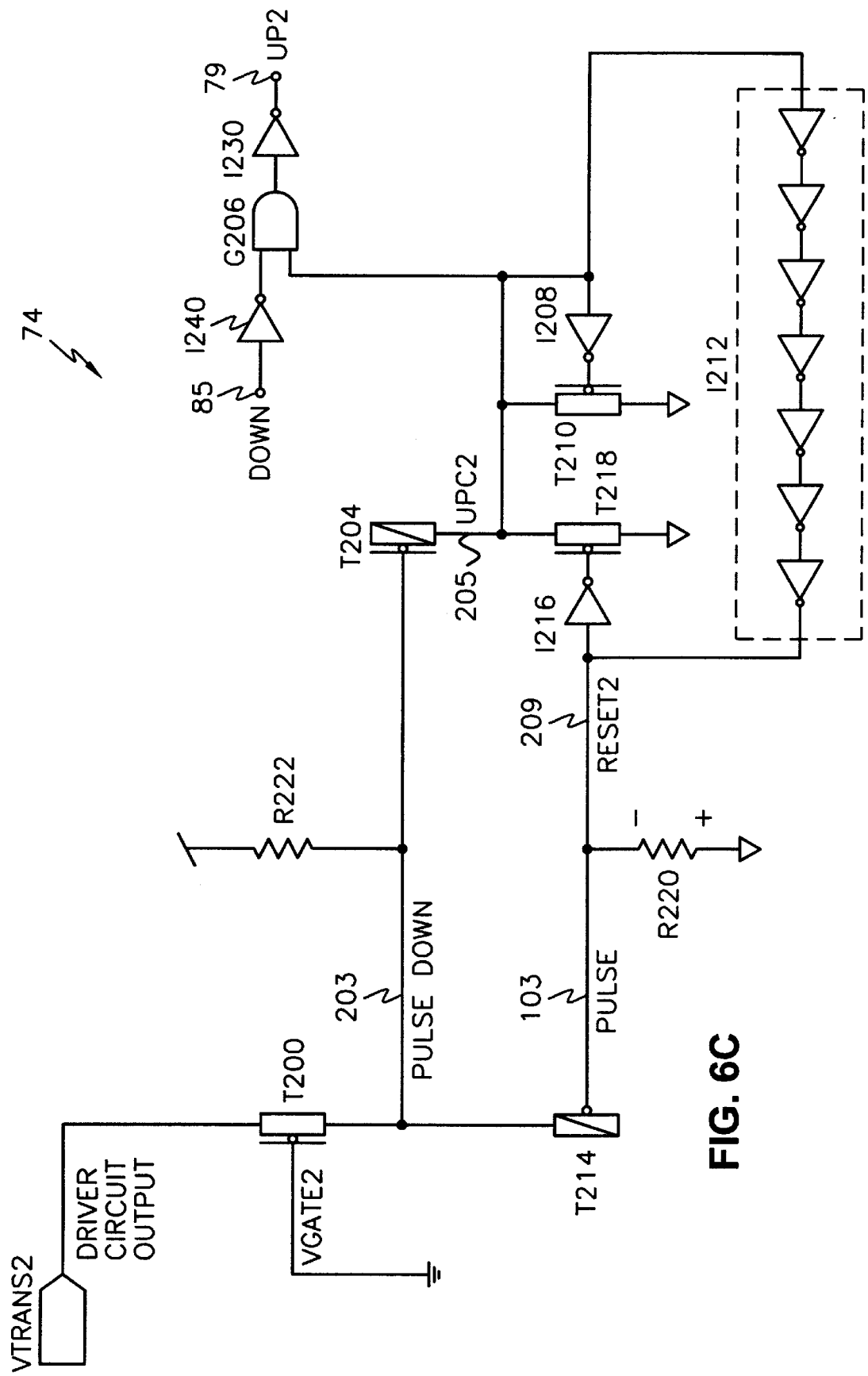
FIG. 6C shows a schematic of the negative detect circuit according to the second embodiment of the present invention.

The negative detect circuitry (74) is a mirror image of the positive detect circuitry (72). When a negative transient or undershoot occurs on the output of the driver circuit (20), the negative detect circuitry (72) generates a high pulse at node UP2 (79). The negative detect circuitry (72) is preferably implemented as shown in FIG. 6C.

A pulse down transistor (T200), which is an NFET, is connected to a low reference potential, typically ground, at its control gate (VGATE2). The pulse down transistor (T200) is connected to the output of the driver circuit (20) at its source and to node PULSE DOWN (203) at its drain. When a negative transient occurs on the output of the driver circuit (20), the pulse down transistor (T200) switches the node PULSE DOWN (203) from high to low. A down interrogate transistor (T204), which is a PFET, is connected to the node PULSE DOWN (203) at its control gate, to internal power at its source, and to node UPC2 (205) at its drain. When the node PULSE DOWN (203) switches to low, the down interrogate transistor (T204) switches node UPC2 (205) from low to high.

Down (85) is connected to the input of an inverter (I240) whose output is connected to an input of a NAND gate (G206). Node UPC2 (205) is connected to the other input of NAND gate (G206). NAND gate (G206) is connected in series with a UP2 inverter (I230) then a node UP2 (79). An up (high) pulse is generated on node UP2 (79) when node UPC2 (205) is high due to a low transient, provided node DOWN (85) has not been switched to a high level by the CLK down generator (83). Node UPC2 (205) is also connected to a voltage keeper comprising an inverter (I208) connected to the control gate of an NFET keeper transistor (T210). The source of the NFET keeper transistor (T210) is connected to ground and the drain is connected to node UPC2 (205) such that node UPC2 (205) is held at a low state until interrogation by the down interrogate transistor (T204) can occur, thereby preventing accidental tripping by system noise.

Node UPC2 (205) is also connected to a second reset loop comprising an odd number of reset delay inverters (I212) connected in series. The last reset delay inverter (I212) is connected to node RESET2 (209). The number of reset delay inverters (I212) is sufficient to cause a delay longer than the duration of the transient. Experimental modeling has shown that seven reset delay inverters (I212) are typically sufficient. When node UPC2 (205) switches to high, the reset loop switches node RESET2 (209) from high to low. The node RESET2 (209) is connected to the control gate of a pulse down reset transistor (T214), which is a PFET connected to internal power at its source and to node PULSE DOWN (203) at its drain. When node RESET2 (209) switches to low, the pulse down reset transistor (T214) switches node PULSE DOWN (203) back to its original state of high.

Node RESET2 (209) is also connected to a UPC2 reset inverter (I216), which is in turn connected to the control gate of a UPC2 reset transistor (T218). The UPC2 reset transistor (T218) is an NFET connected to ground at its source and to node UPC2 (205) at its drain. When node RESET2 (209) switches to low, the UPC2 reset transistor (T218) switches node UPC2 (205) back to its original state of low.

A third optional isolating resistive device (R220) can be connected between ground and node RESET2 (209) to prevent accidental switching due to coupling to external signals or system noise. Likewise, a fourth optional isolating resistive device (R222) can be connected between internal power and node PULSE DOWN (203). The isolating resistive devices (R220, R222) can be resistors or resistively connected FETs.

In the above description, the terms "low pulse," "low state," and "low" and, similarly, the terms "high pulse," "high state," and "high" refer to relative voltage states and do not imply a specific magnitude.

Impedance Matching Calculations

The purpose of the adjustable-length transmission line (52) is to reduce transient voltages by providing a matching impedance for the reactive component of the impedance of the receiver circuit (10) to the driver circuit (20). When the adjustable-length transmission line (52) is short circuited at one end, the input impedance at the other end will have no resistive component. The reactive component (i.e., capacitive or inductive) of the input impedance will have a magnitude dependent on the length (D52) of the adjustable-length transmission line (52) and the frequency (f) of the signal from the driver circuit (20).

Thus, with a reactive impedance that can be adjusted, impedance matching between the on-chip driver circuit (20) and the off-chip receiver circuit (10) can be achieved for a wide range of configurations. Frequency (f) is dependant upon system design, where performance demands increasingly require operation at ultra-high frequencies (0.5 GHz and above). The required length (D52) of the adjustable-length transmission line (52) can be calculated using electromagnetic principles as described in chapter 12 of *Engineering Electromagnetics,* by William H. Hayt, Jr., McGraw-Hill, 1981, incorporated herein by reference.

Referring again to FIG. 2A, the resistive component (R1) and the reactive component (X1) of the input impedance (Z1) on the receiver side of the transmission line (40) are given by Equations 1 and 2, respectively, in terms of frequency (f), receiver resistance (R10), receiver capacitance (C10), and receiver inductance (L31). As is known in the art, impedance can generally be expressed as $Z=R+j\cdot X$ and, therefore, the input impedance (Z1) can be expressed in the form of Equation 0.

$$Z1 = R1 + j \cdot X1 \quad \text{(Equation 0)}$$

Equations 1 and 2 can be derived for an inductor (such as receiver inductance (L31)) in series with a parallel capacitor (such as receiver circuit capacitance (C10)) and resistor (such as receiver circuit resistance (R10)), as shown in FIG. 2A. Angular frequency ($\omega$) is equal to $2\pi f$.

$$R1 = \frac{R10}{1 + (\omega \cdot R10 \cdot C10)^2} \quad \text{(Equation 1)}$$

$$X1 = \frac{\omega L31 - (\omega \cdot R10^2 \cdot C10) + (\omega^3 \cdot R10^2 \cdot L31 \cdot C10^2)}{1 + (\omega \cdot R10 \cdot C10)^2} \quad \text{(Equation 2)}$$

From *Engineering Electromagnetics,* the input impedance (Z4) at the driver side of the transmission line (40) can be expressed in terms of the characteristic impedance (Z40) of the transmission line (40), the load or input impedance (Z1), the transmission line length (D40), and a phase factor ($\beta$40) for the transmission line (40).

$$Z4 = Z40 \cdot \frac{Z1 + [j \cdot Z40 \cdot \tan(\beta 40 \cdot D40)]}{Z40 + [j \cdot Z1 \cdot \tan(\beta 40 \cdot D40)]} \quad \text{(Equation 3)}$$

The phase factor ($\beta$40) is dependent upon the frequency (f) of the signal from the driver circuit (20) and the dielectric constant ($\epsilon$40) and the relative permeability ($\mu$40) for the transmission line (40), and can be determined using equations 4A and 4B, where "c" is the speed of light ($3\times10^8$m/s).

$$\beta 40 = \frac{2\pi f}{v40} \quad \text{(Equation 4A)}$$

$$v40 = \frac{c}{(\mu 40 \cdot \epsilon 40)^{-0.5}} \quad \text{(Equation 4B)}$$

The resistive component (R4) and the reactive component (X4) of the input impedance (Z4) on the driver side of the transmission line (40) can be determined by substituting Equation 0 into Equation 3 and separating the real (resistive) and imaginary (reactive) components. The resistive component (R4) of the input impedance (Z4) at the driver side of the transmission line (40) can be expressed as Equation 5, and the reactive component (X4) of the input impedance (Z4) at driver side of the transmission line (40) can be expressed as Equation 6.

$$R4 = (R1 \cdot Z40)^2 \frac{1 + \tan^2(\beta 40 \cdot D40)}{[Z40 - (X1 \cdot \tan(\beta 40 \cdot D40))]^2 + [R1 \cdot \tan(\beta 40 \cdot D40)]^2} \quad \text{(Equation 5)}$$

$$X4 = Z40 \frac{\{[X1 + (Z40 \cdot \tan(\beta 40 \cdot D40))] \cdot [Z40 - (X1 \cdot \tan(\beta 40 \cdot D40))]\} - [R1^2 \cdot \tan(\beta 40 \cdot D40)]}{[Z40 - (X1 \cdot \tan(\beta 40 \cdot D40))]^2 + [R1 \cdot \tan(\beta 40 \cdot D40)]^2} \quad \text{(Equation 6)}$$

Figure 4:
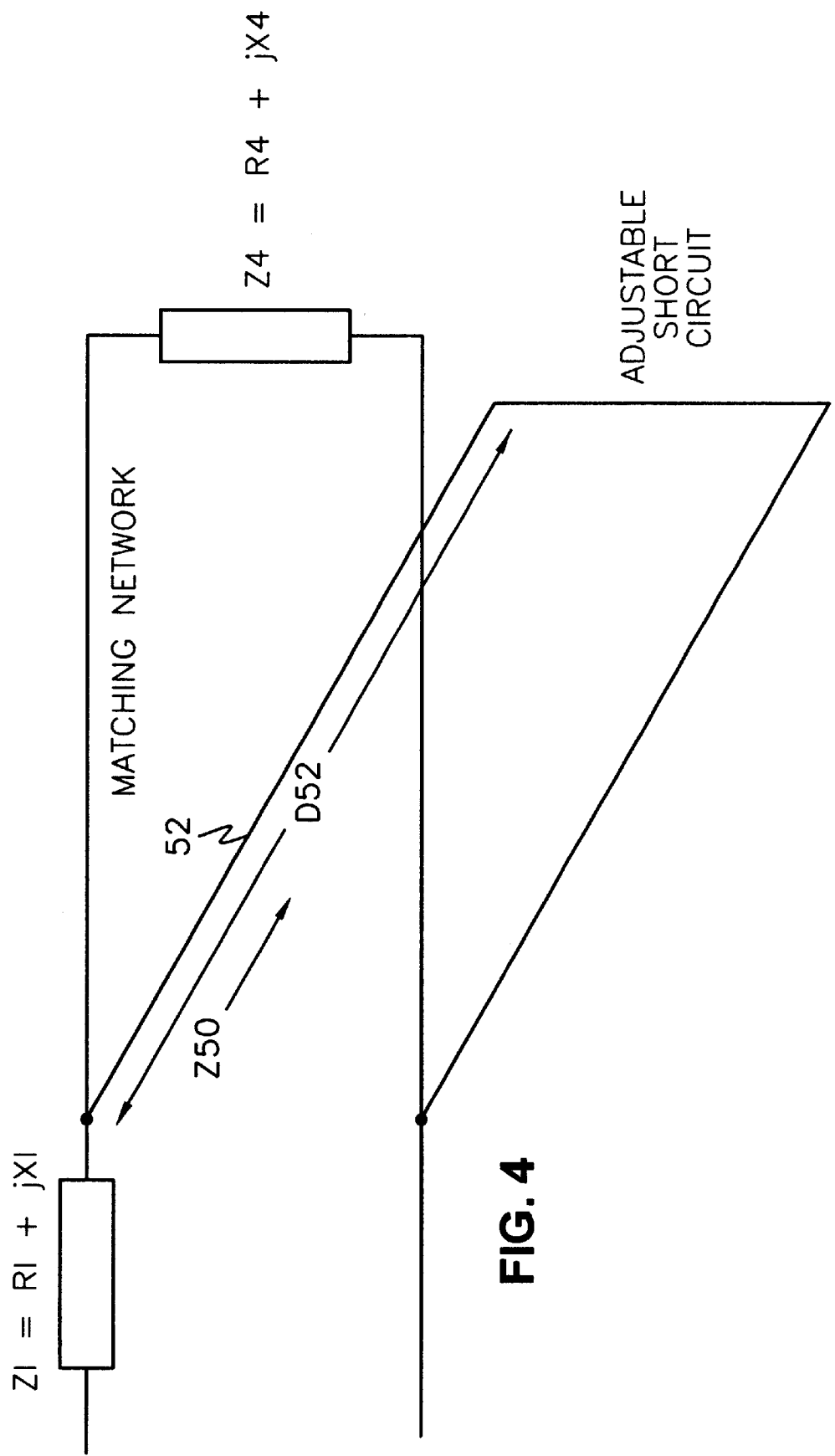
FIG. 4 illustrates an alternate circuit model showing the impedance matching network as an adjustable length transmission line, according to the present invention.

As shown in FIG. 2A, R4 and X4 are also the resistive and reactive components of the impedance at the receiver side of the matching network (50). The driver circuit (20), matching network (50), transmission line (40) and receiver circuit (10) of FIG. 2A can now be reduced to the circuit shown in FIG. 4, where the impedance (Z50) of the matching network (50) and the input impedance (Z4) on the receiver side of the matching network (50) are in parallel.

The equivalent impedance (Z50) of the matching network (50) has no resistive component because the adjustable-length transmission line (52) is short circuited. The equivalent impedance (Z50) of the matching network (50), as given by Equation 7, can be expressed as a function of the characteristic impedance (Z52) of the adjustable-length transmission line (52), the phase factor ($\beta$52) of the adjustable-length transmission line (52), and the length (D52) to which the adjustable-length transmission line (52) is set.

$$Z50 = j \cdot Z52 \cdot \tan(\beta 52 \cdot D52) \quad \text{(Equation 7)}$$

The phase factor ($\beta$52) for the adjustable-length transmission line (52) is dependent upon the frequency (f) of the signal from the driver circuit (20) and the dielectric constant ($\epsilon$52) and the relative permeability ($\mu$52) for the adjustable-length transmission line (52). The phase factor ($\beta$52) for the adjustable-length transmission line (52) can be determined using equations 8A and 8B, where "c" is the speed of light ($3\times10^8$m/s).

$$\beta 52 = \frac{2\pi f}{v52} \quad \text{(Equation 8A)}$$

$$v52 = \frac{c}{(\mu 52 \cdot \epsilon 52)^{-0.5}} \quad \text{(Equation 8B)}$$

Figure 5:
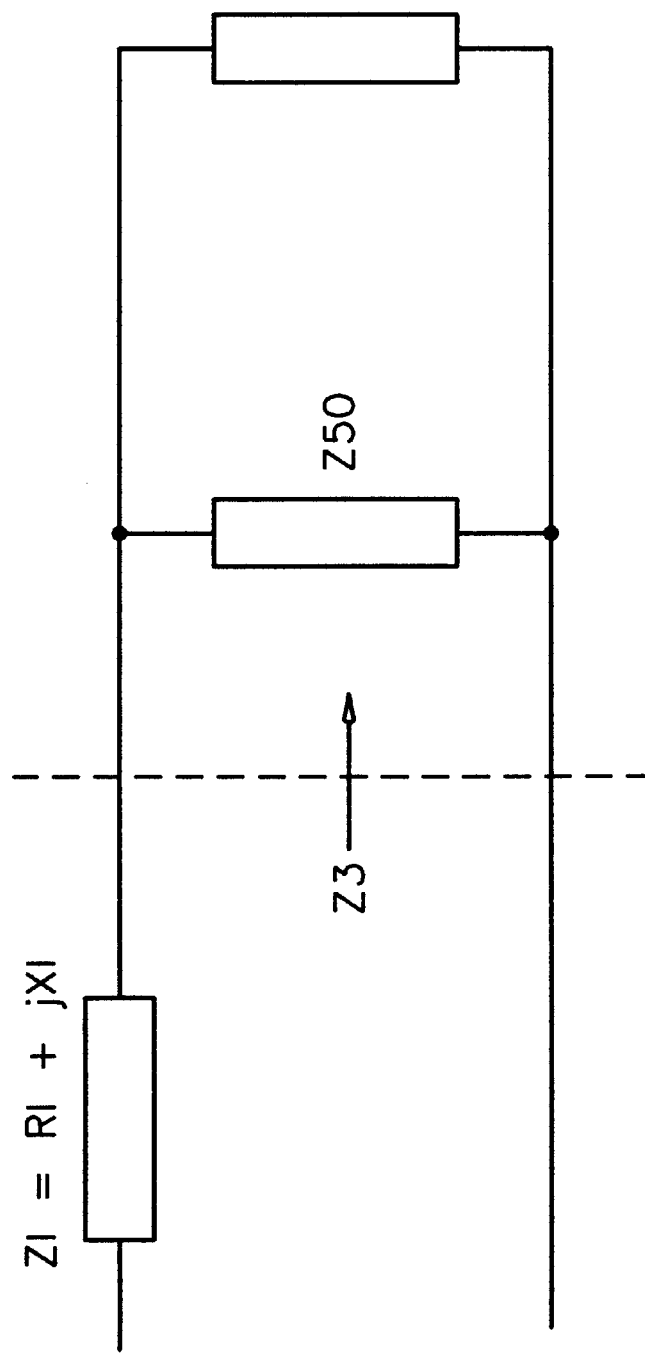
FIG. 5 illustrates a circuit model showing a composite impedance as derived for the receiver side of the matching network.

Referring to FIG. 5, the net input impedance (Z3) at the driver side of the matching network (50) is given by Equation 9. The resistive component (R3) of the net input impedance (Z3) is given by Equation 10. The reactive component (X3) of the net input impedance (Z3) is given by Equation 11.

$$Z3 = \frac{[j \cdot Z52 \cdot \tan(\beta 52 \cdot D52)](R4 + j \cdot X4)}{R4 + j \cdot X4 + [j \cdot Z52 \cdot \tan(\beta 52 \cdot D52)]} \quad \text{(Equation 9)}$$

$$R3 = \frac{[X4 + Z52 \cdot \tan(\beta 52 \cdot D52)][R4 \cdot Z52 \cdot \tan(\beta 52 \cdot D52)] - [X4 \cdot R4 \cdot Z52 \cdot \tan(\beta 52 \cdot D52)]}{R4^2 + [X4 + Z52 \cdot \tan(\beta 52 \cdot D52)]^2} \quad \text{(Equation 10)}$$

$$X3 = \frac{[X4 \cdot Z52 \cdot \tan(\beta 52 \cdot D52)][X4 + Z52 \cdot \tan(\beta 52 \cdot D52)] + [R4^2 \cdot Z52 \cdot \tan(\beta 52 \cdot D52)]}{R4^2 + [X4 \cdot Z52 \cdot \tan(\beta 52 \cdot D52)]^2} \quad \text{(Equation 11)}$$

The equivalent impedance (ZI) for the driver circuit (20) can be derived from the circuit model of FIG. 2A, and is given by Equation 12. The resistive component (RI) of the input impedance (ZI) to the driver side of the matching network (50) is given by Equation 13, and the reactive component (XI) of the input impedance (ZI) to the driver side of the matching network (50) is given by Equation 14. Equations 13 and 14 can be derived for a parallel driver circuit capacitance (C20) and driver circuit resistance (R20) in series with a driver inductance (L32), as shown in FIG. 2A.

$$ZI = \frac{R20 \cdot (1/j \cdot \omega \cdot C20)}{R20 + (1/j \cdot \omega \cdot C20)} + j \cdot \omega \cdot L32 \quad \text{(Equation 12)}$$

$$RI = \frac{R20}{1 + (\omega \cdot R20 \cdot C20)^2} \quad \text{(Equation 13)}$$

$$XI = \frac{-(\omega \cdot R20^2 \cdot C20)}{1 + (\omega \cdot R20 \cdot C20)^2} + \omega \cdot L32 \quad \text{(Equation 14)}$$

Referring again to FIG. 5, for impedance matching, the reactive components of the net input impedance (Z3) at the driver side of the matching network (50) and of the equivalent impedance (ZI) for the driver circuit (20) must cancel out (i.e., the matching network (50) must provide a reactance, which in combination with the driver and receiver circuits, will give no net reactance). To do this, the reactive component (X3) must be the conjugate (equal in magnitude with the opposite sign) of the reactive component (XI), as shown in Equation 15. The matching of the reactive components will result in no overshoots or undershoots.

$$XI = -X3 \quad \text{(Equation 15)}$$

Figure 7:
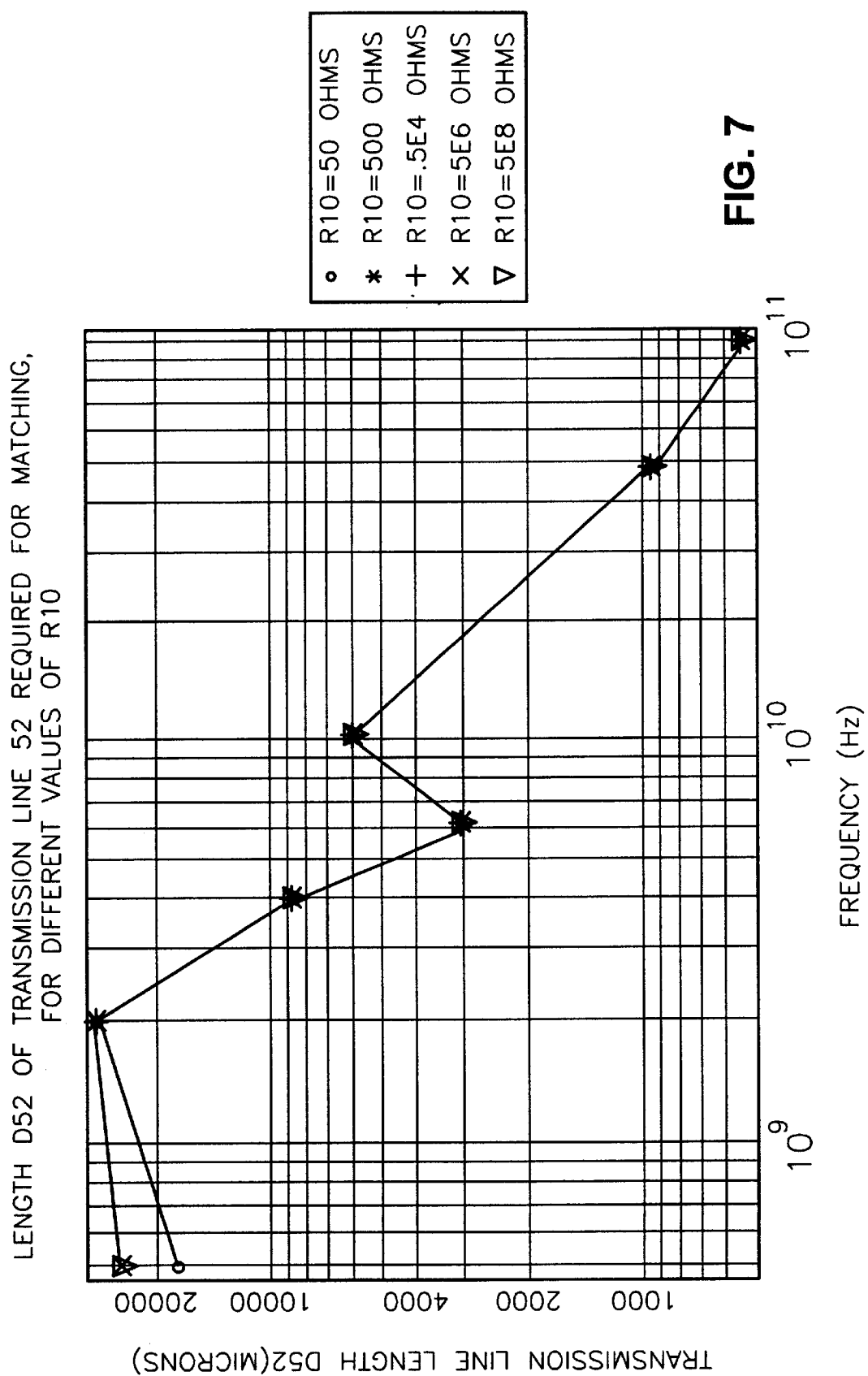
FIG. 7 shows the calculated result for impedance matching for the cases in which selected values of load resistance (termination resistance) range from 50 ohms to 500 mega ohms, with the results provided in terms of the length for the adjustable length transmission line required to achieve impedance matching, as a function of frequency ranging from 0.5 to 100 giga hertz (GHz)

Equations 11 and 14 can be substituted into Equation 15. Selected values for frequency (f) and length (D52) of the adjustable-length transmission line (52) can be substituted into Equation 15 to determine, by the process of iteration, the values at which the net reactance (XI+X3) is equal to zero (0), thereby achieving impedance matching. FIG. 7 shows the values for length (D52) of the adjustable-length transmission line (52) as a function of frequency (f) which provide impedance matching over a range of selected values for the receiver circuit resistance (termination load) (R10) ranging from 50 ohms to 500 mega ohms. The values shown in FIG. 7 are determined using typical values as previously provided for C10 (3.7 pF), L31 (2 nH), D40 (76 mm or 3 inches), Z40 (50 ohms), ε40 (4.5), L32 (2 nH), C20 (4.7 pF), Z52 (50 ohms), and ε52 (4.5).

Figure 8:
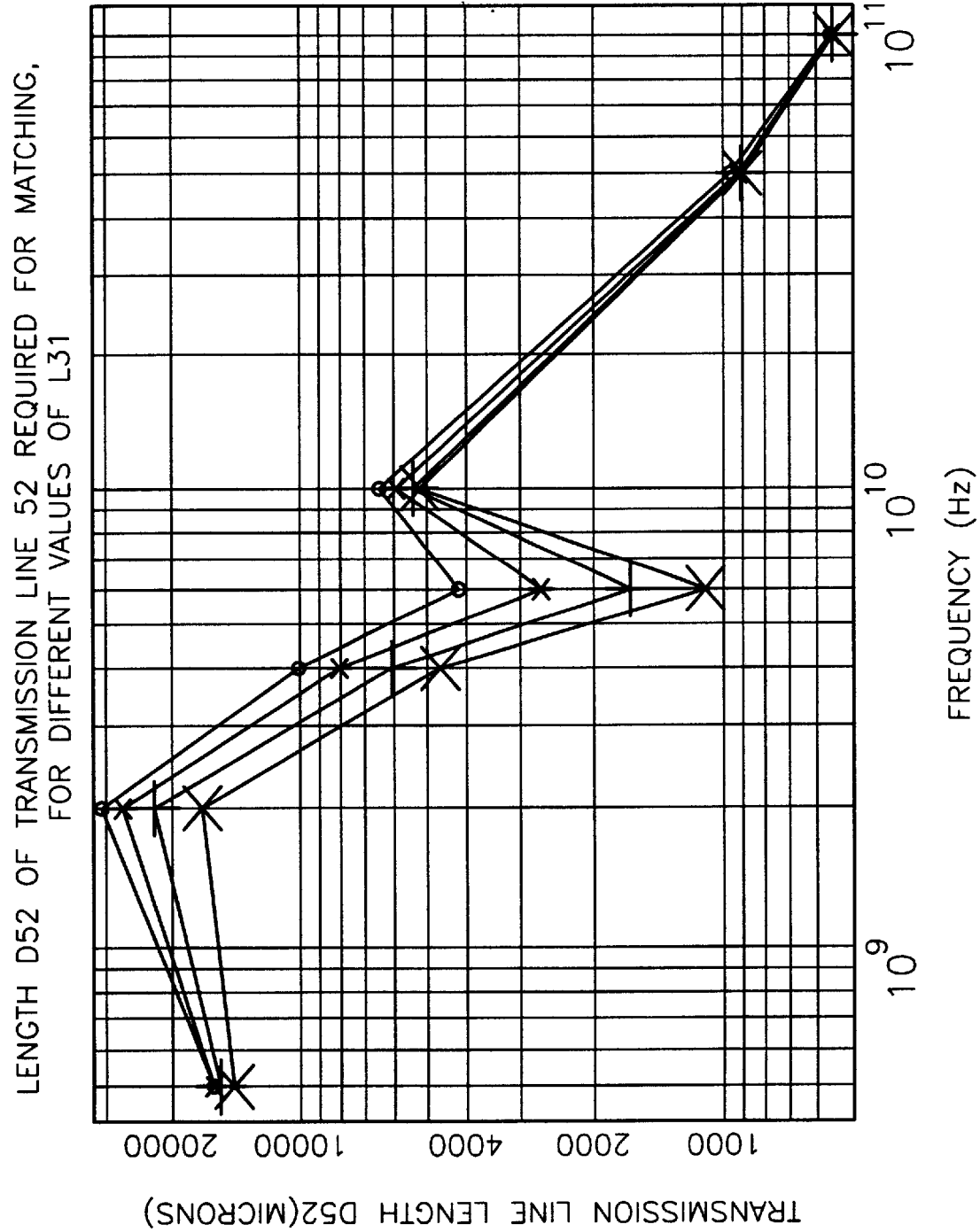
FIG. 8 shows the length of the adjustable-length transmission line required for impedance matching, as a function of frequency, for selected values of the receiver inductance ranging from 1 to 8 nano henry (nH)

Additional iterative solutions were plotted for the length (D52) of the adjustable-length transmission line (52) as a function of frequency (f) over a range of selected values for L31, L32, C10, C20, ε40, ε52, D40, Z40, and Z52, successively. FIG. 8 shows that the present invention can provide impedance matching using a comparable length (D52) adjustable-length transmission line (52) for a receiver inductance (L31) in the range between 1 nH and 8 nH. The values shown in FIG. 8 are determined using typical values as previously provided for C10 (3.7 pF), R10 (50 ohms), D40 (76 mm or 3 inches), Z40 (50 ohms), ε40 (4.5), L32 (2 nH), C20 (4.7 pF), Z52 (50 ohms), and ε52 (4.5).

Figure 9:
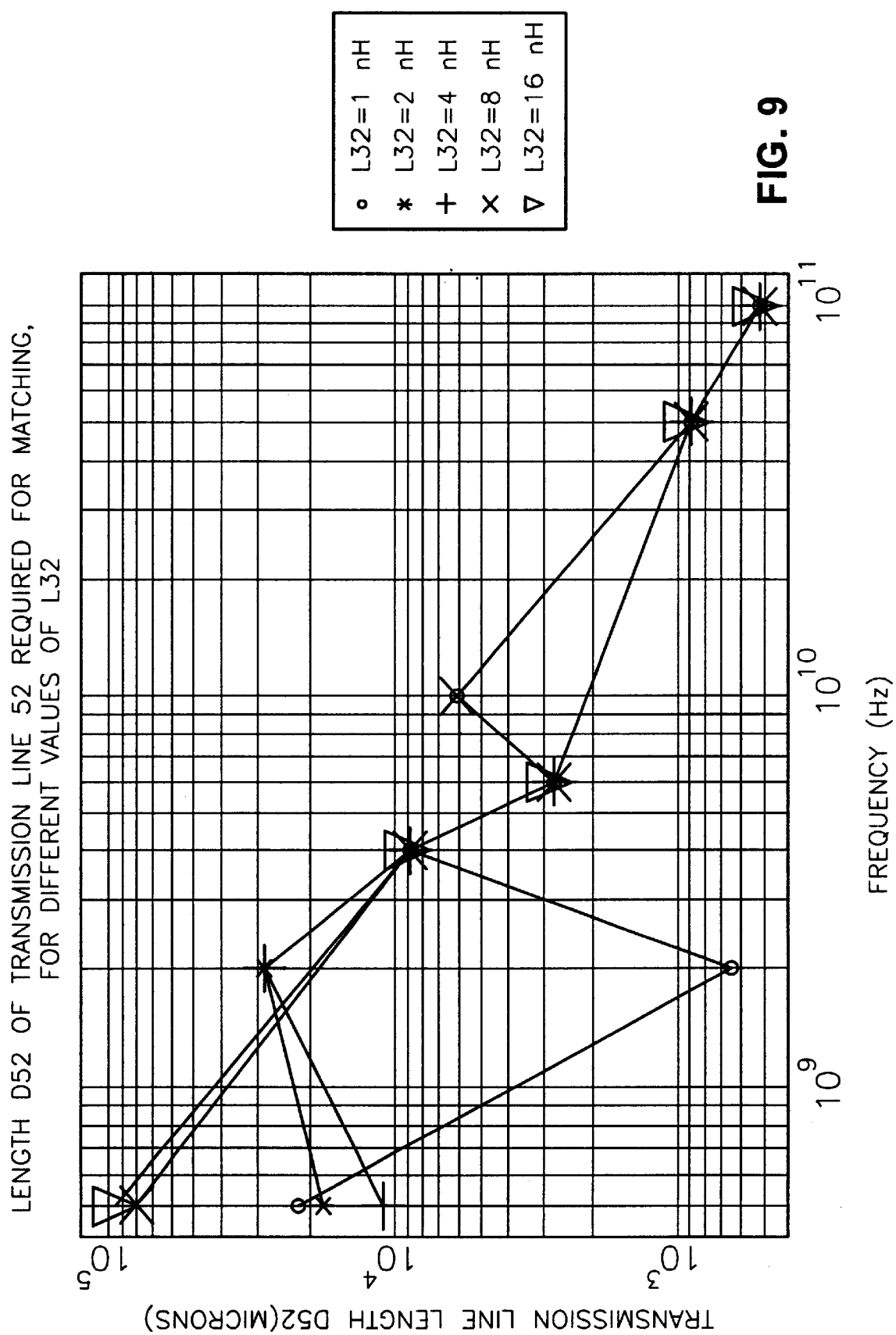
FIG. 9 shows the length of the adjustable-length transmission line required for impedance matching, as a function of frequency, for selected values of the driver inductance ranging from 1 to 16 nH.

FIG. 9 shows that the present invention can provide impedance matching using a comparable length (D52) adjustable-length transmission line (52) for a driver inductance (L32) in the range between 1 nH and 16 nH. The values shown in FIG. 9 are determined using typical values as previously provided for C10 (3.7 pF), R10 (50 ohms), D40 (76 mm or 3 inches), Z40 (50 ohms), ε40 (4.5), L31 (2 nH), C20 (4.7 pF), Z52 (50 ohms), and ε52 (4.5).

Figure 10:
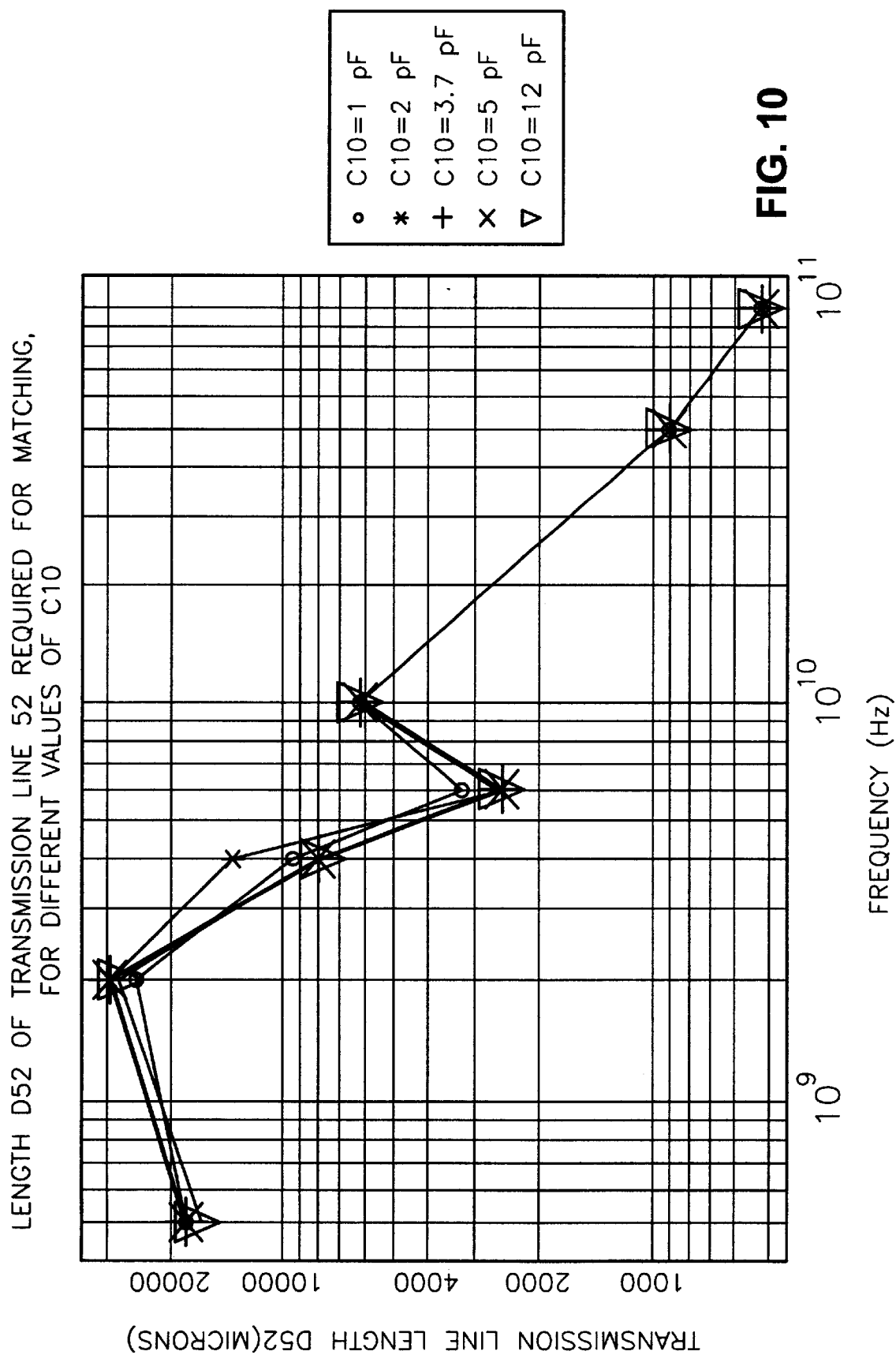
FIG. 10 shows the length of the adjustable-length transmission line required for impedance matching, as a function of frequency, for selected values of the receiver capacitance ranging from 1 pF to 12 pF.

FIG. 10 shows that the present invention can provide impedance matching using a comparable length (D52) adjustable-length transmission line (52) for a receiver capacitance (C10) in the range between 1 pF and 12 pF. The values shown in FIG. 10 are determined using typical values as previously provided for C20 (4.7 pF), R10 (50 ohms), D40 (76 mm or 3 inches), Z40 (50 ohms), ε40 (4.5), L31 (2 nH), L32 (2 nH), Z52 (50 ohms), and ε52 (4.5).

Figure 11:
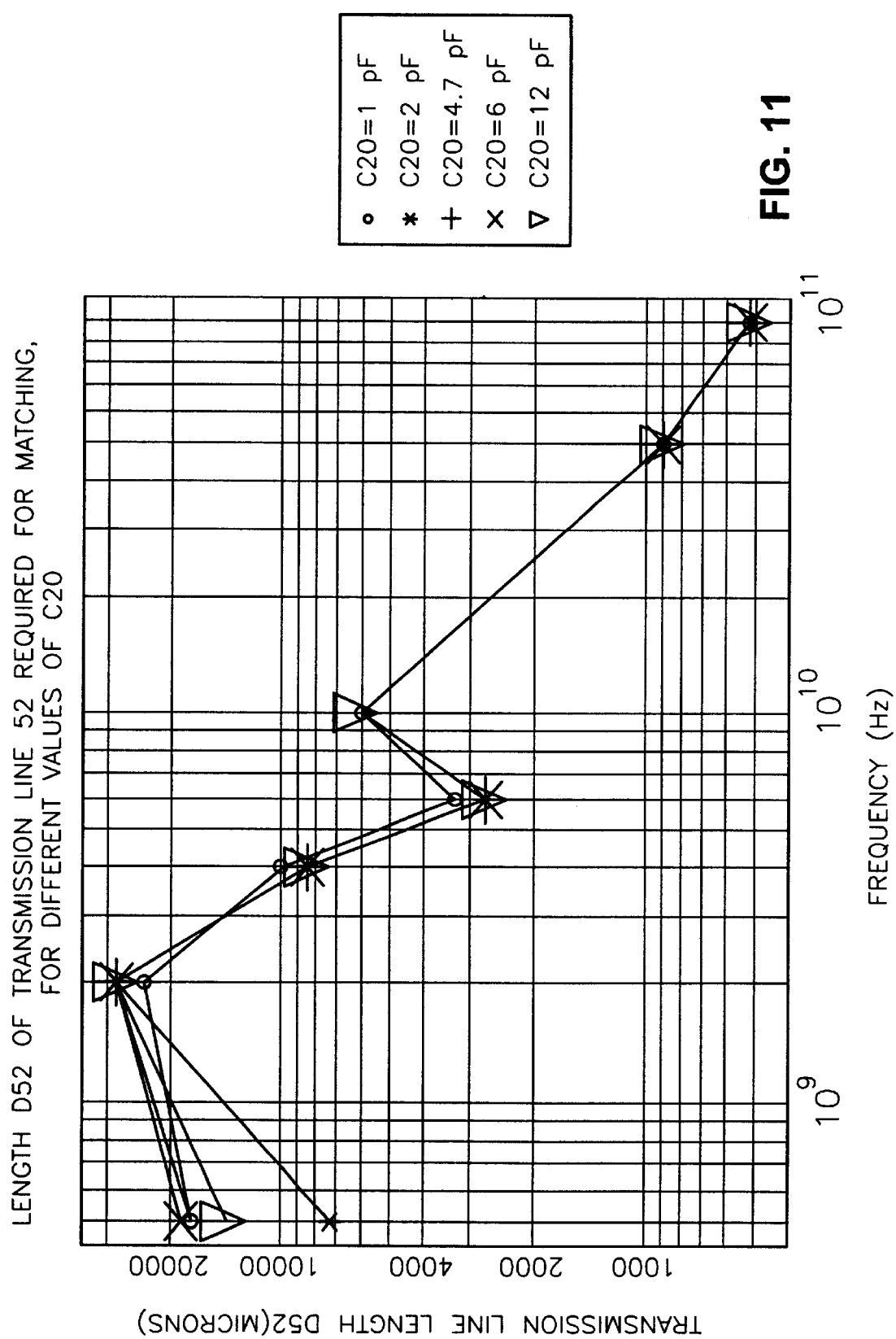
FIG. 11 shows the length of the adjustable-length transmission line required for impedance matching, as a function of frequency, for selected values of the driver capacitance ranging from 1 pF to 12 pF.

FIG. 11 shows that the present invention can provide impedance matching using a comparable length (D52) adjustable-length transmission line (52) for a driver capacitance (C20) in the range between 1 pF and 12 pF. The values shown in FIG. 11 are determined using typical values as previously provided for C10 (3.7 pF), R10 (50 ohms), D40 (76 mm or 3 inches), Z40 (50 ohms), ε40 (4.5), L31 (2 nH), L32 (2 nH), Z52 (50 ohms), and ε52 (4.5).

Figure 12:
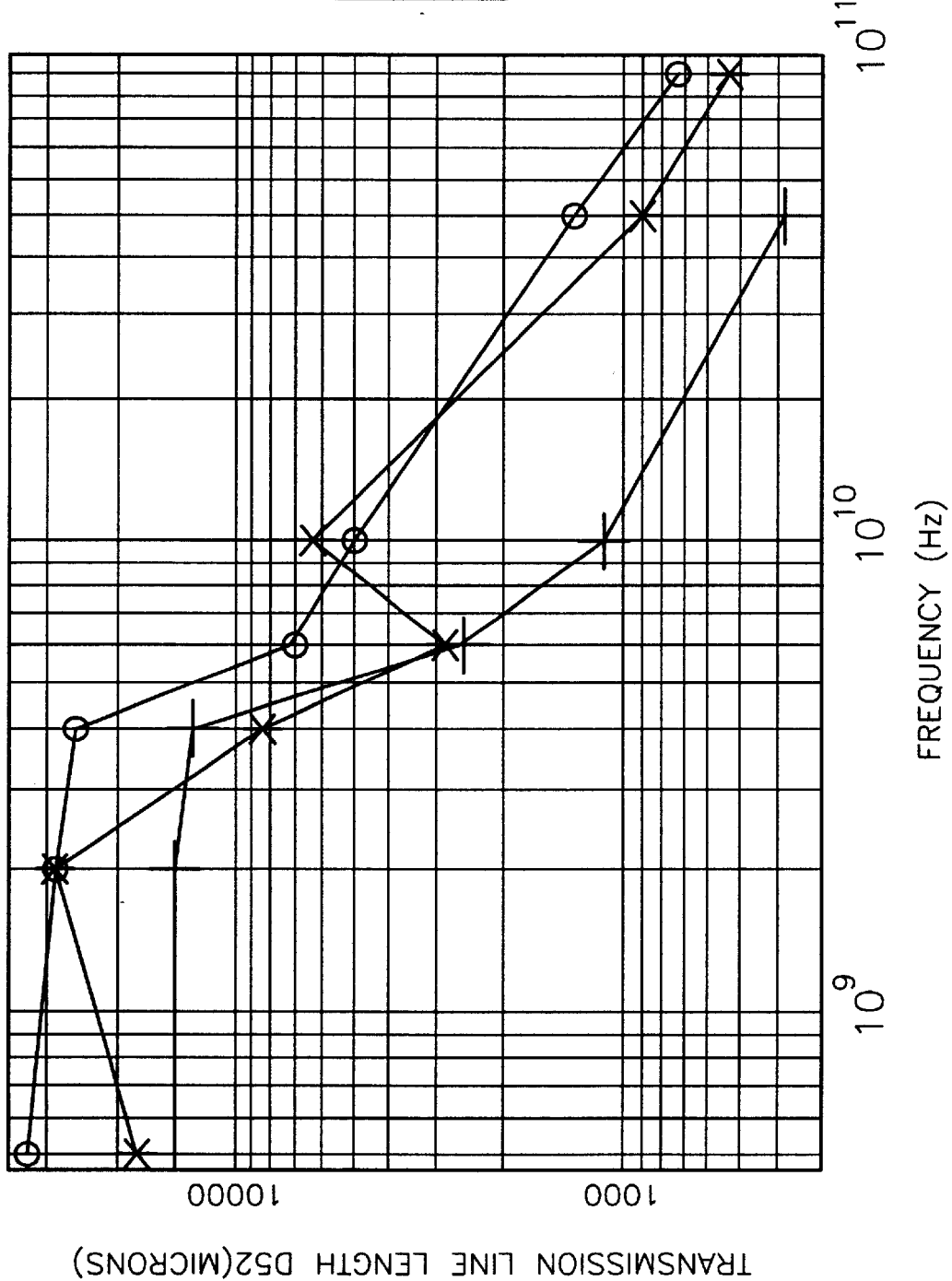
FIG. 12 shows the length of the adjustable-length transmission line required for impedance matching, as a function of frequency, for selected values of the dielectric constant for both the transmission line and the adjustable-length transmission line ranging from 2 to 6.

FIG. 12 shows that the present invention can provide impedance matching using a comparable length (D52) adjustable-length transmission line (52) for a dielectric constant (ε40, ε52) for the transmission line (40) and the adjustable-length transmission line (52) in the range between 2 and 6. The values shown in FIG. 12 are determined using typical values as previously provided for C10 (3.7 pF), C20 (4.7 pF), R10 (50 ohms), D40 (76 mm or 3 inches), Z40 (50 ohms), L31 (2 nH), L32 (2 nH), and Z52 (50 ohms).

Figure 13:
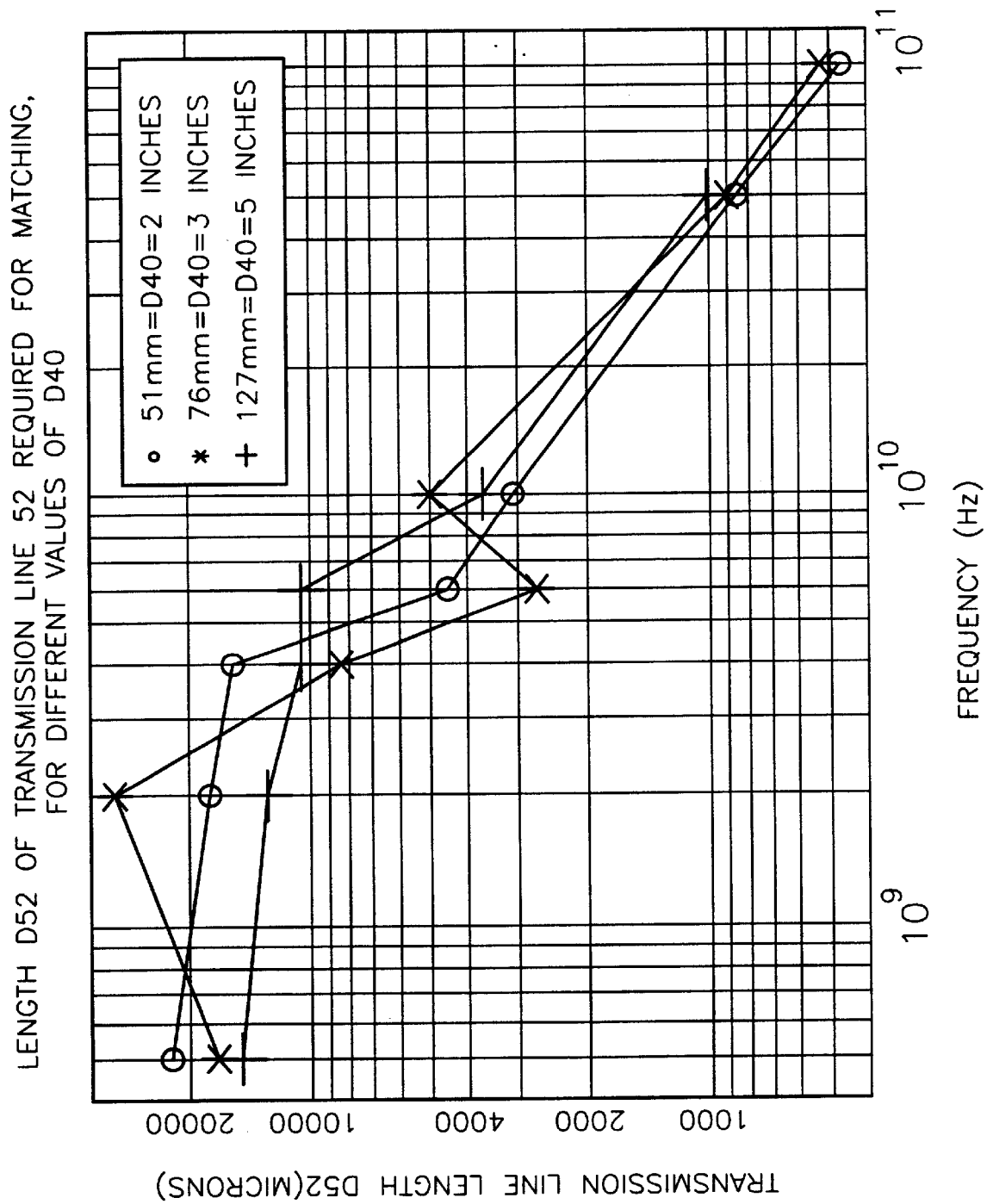
FIG. 13 shows the length of the adjustable-length transmission line required for impedance matching, as a function of frequency, for selected values of the length of the transmission line ranging from 51 to 127 mm (2 to 5 inches)

FIG. 13 shows that the present invention can provide impedance matching using a comparable length (D52) adjustable-length transmission line (52) for a length (D40) of the transmission line (40) in the range between 51 mm (2 inches) and 127 mm (5 inches). The values shown in FIG. 13 are determined using typical values as previously provided for C10 (3.7 pF), C20 (4.7 pF), R10 (50 ohms), Z40 (50 ohms), Z52 (50 ohms), ε40 (4.5), L31 (2 nH), L32 (2 nH), and ε52 (4.5).

Figure 14:
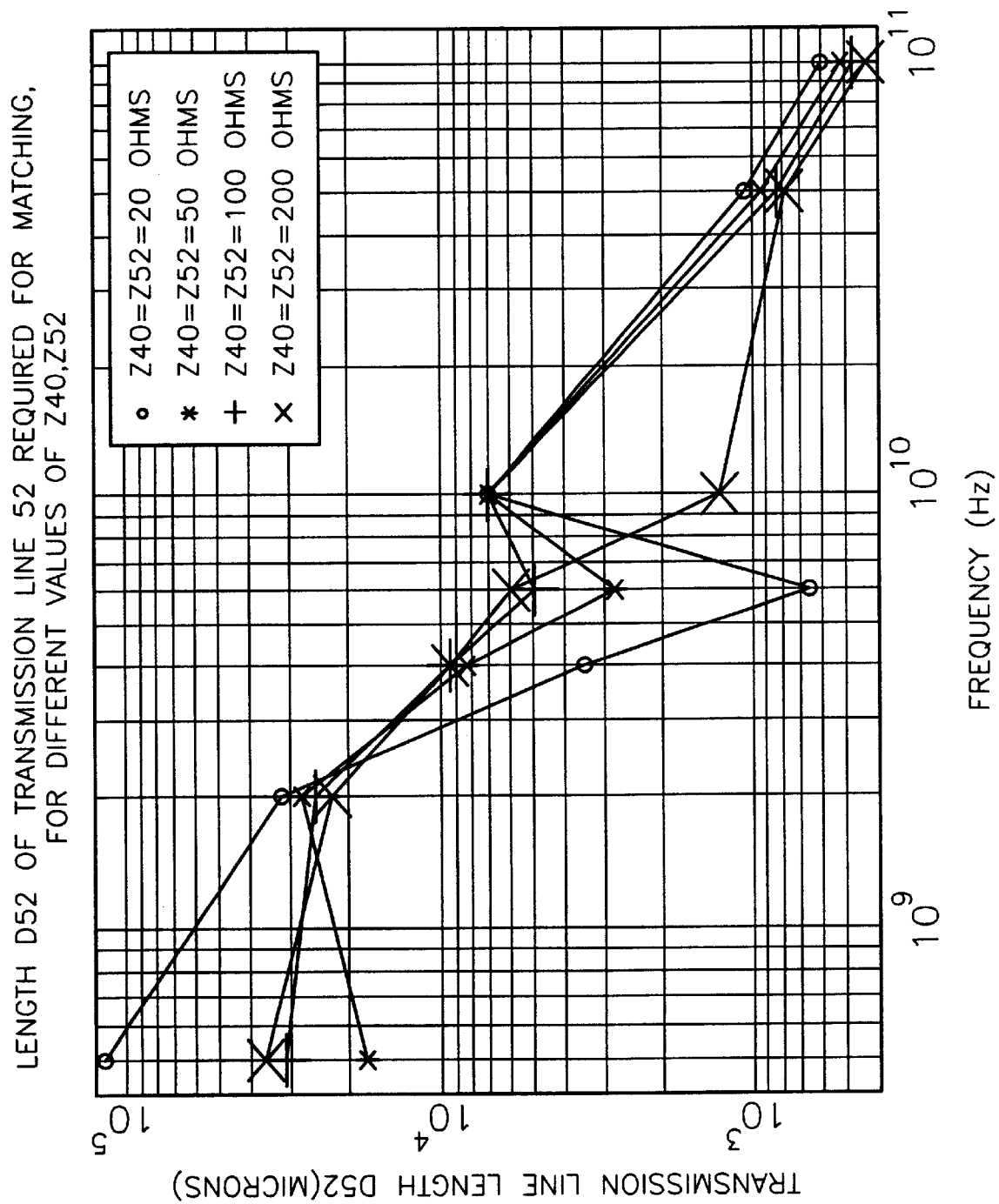
FIG. 14 shows the length of the adjustable-length transmission line required for impedance matching, as a function of frequency, for selected values of the characteristic impedance of both the transmission line and the adjustable-length transmission line in the range from 20 ohms to 200 ohms.

FIG. 14 shows that the present invention can provide impedance matching using a comparable length (D52) adjustable-length transmission line (52) for a characteristic impedance (Z40, Z52) of the transmission line (40) and of the adjustable-length transmission line (52) in the range between 20 ohms and 200 ohms. The values shown in FIG. 14 are determined using typical values as previously provided for C10 (3.7 pF), C20 (4.7 pF), R10 (50 ohms), D40 (76 mm or 3 inches), ε40 (4.5), L31 (2 nH), L32 (2 nH), and ε52 (4.5).

Although illustrated and described above with reference to certain specific embodiments, the present invention is nevertheless not intended to be limited to the details shown. Rather, various modifications may be made in the details within the scope and range of equivalents of the claims and without departing from the spirit of the invention.

What is claimed is:

1. An impedance matching network comprising:

input-output driver circuit having an output;

an adjustable-length transmission line being connected in parallel with the input-output driver circuit, wherein the length of the adjustable-length transmission line can be manually adjusted to provide impedance matching at the output of the driver circuit, and having two parallel conductive lines connected at one end to the driver circuit and a movable stub, the adjustable-length transmission line electrically shorted by the movable stub; and a system card and a semiconductor chip located on the system card, the driver circuit located on the semiconductor chip and the parallel conductive lines having strips of conductive material formed directly on the system card.

2. An impedance matching network further comprising:

an input-output driver circuit having an output; and an adjustable-length transmission line being connected in parallel with the input-output driver circuit and having two parallel conductive lines connected at one end to the driver circuit and a movable stub, the adjustable-length transmission line electrically shorted by the movable stub, and wherein the length of the adjustable-length transmission line can be manually adjusted to precisely set the distance between the point where the parallel conductive lines are shorted by the moveable stub and the point where the parallel conductive lines are connected to the driver circuit to provide impedance matching at the driver circuit output.

3. The impedance matching network of claim 2 wherein the length of the adjustable-length transmission line is adapted to be adjusted using a vernier.

4. An impedance matching system comprising:

a system card;

a semiconductor chip located on the system card;

a driver circuit located on the semiconductor chip and having an output and a capacitance;

a driver connection having an inductance;

an impedance matching network located on the system card and connected in parallel to the driver circuit;

a receiver circuit having a resistance and a capacitance;

a receiver connection having an inductance; and a transmission line connected at one end to both the impedance matching network and, through the driver connection, to the output of the driver circuit and connected on the opposite end through the receiver connection to the receiver circuit, the transmission line having a characteristic impedance and a dielectric constant, wherein impedance matching is provided for a length of the transmission line in the range between about 50 and 125 mm.

5. A process for reducing overshoots and undershoots on a driver circuit by impedance matching, comprising the steps of:

providing a movable stub connected across two parallel conductive lines connected in parallel to the driver circuit at one end thereby forming an adjustable-length transmission line comprising the parallel conductive lines and the movable stub;

initially positioning the movable stub such that the adjustable-length transmission line is at its maximum length;

detecting overshoots and undershoots on the output of the driver circuit using electronic monitoring equipment;

locating the movable stub which is connected across the two parallel conductive lines a distance determined by the magnitude of overshoots and undershoots detected; and repeating the detecting and locating steps until the adjustable-length transmission line is adjusted to a length at which the impedance at the driver circuit is matched and overshoots and undershoots are reduced to an acceptable magnitude.

6. A process for reducing overshoots and undershoots on a driver circuit by impedance matching, comprising the steps of:

detecting overshoots and undershoots on the output of the driver circuit using electronic monitoring equipment;

using a vernier device to locate a movable stub which is connected across two parallel conductive lines a distance determined by the magnitude of overshoots and undershoots detected, the parallel conductive lines being connected in parallel to the driver circuit at one end thereby forming an adjustable-length transmission line comprising the parallel conductive lines and the movable stub; and repeating the first and second steps until the adjustable-length transmission line is adjusted to a length at which the impedance at the driver circuit is matched and overshoots and undershoots are reduced to an acceptable magnitude.

7. A process for reducing overshoots and undershoots on a driver circuit by impedance matching, comprising the steps of:

detecting overshoots and undershoots on the output of the driver circuit using electronic monitoring equipment;

locating a movable stub which is connected across two parallel conductive lines a distance determined by the magnitude of overshoots and undershoots detected, the parallel conductive lines being connected in parallel to the driver circuit at one end thereby forming an adjustable-length transmission line comprising the parallel conductive lines and the movable stub; and repeating the first and second steps until the adjustable-length transmission line is adjusted to a length at which the impedance at the driver circuit is matched and overshoots and undershoots are reduced to an acceptable magnitude, wherein the electronic monitoring equipment is connected to the output of the driver circuit throughout the adjustment of the adjustable-length transmission line and the first step and the second step are performed simultaneously.

8. An automatic impedance matching network providing impedance matching for a driver circuit located on a semiconductor chip on a system card and providing a voltage signal to a receiver circuit, the driver circuit having an output and the network comprising:

an adjustable-length transmission line being located on the system card and connected in parallel with the driver circuit and having two parallel conductive lines connected at one end to the driver circuit and a movable stub, the adjustable-length transmission line electrically shorted by the movable stub;

a control circuit located on the system card and generating a control current varied in response to high and low transient voltages on the driver circuit output; and adjustment means located on the system card for adjusting the length of the adjustable-length transmission line proportionally to the control current generated by the control circuit, the adjustment means including:

(a) an electromagnetic coil creating a force in a first direction proportional to the control current, (b) a return spring creating a force in a second direction opposite to the first direction, and (c) a magnetic core, attached to the moveable stub, having a position determined by the equilibrium of the force created by the electromagnetic coil and the force created by the return spring.

9. An automatic, self-resetting control circuit for an impedance matching network that detects overshoots and undershoots on a driver circuit output and provides, to an adjustment mechanism for the impedance matching network having an adjustable-length transmission line, a control current whose magnitude is proportional to the magnitude of overshoots and undershoots on the output of the driver circuit, the control circuit comprising:

positive detect circuitry detecting overshoots on the output of the driver circuit and providing an incremental pulse, the positive detect circuitry including:

(a) a node PULSE having a low state and a higher voltage state, (b) a pulse up transistor activated by an overshoot on the output of the driver circuit, the pulse up transistor switching the node PULSE from the low state to the higher voltage state, the magnitude of the higher voltage state being proportional to the magnitude of the transient overshoot at the output of the driver circuit, (c) a node UPC1 having a low and a high state, (d) an up interrogate transistor activated when the node PULSE switches from the low state to the higher voltage state, the up interrogate transistor switching the node UPC1 from the high to the low state, (e) a voltage keeper holding node UPC1 high until activation of the up interrogate transistor, (f) a reset delay loop delaying a reset signal for a length of time greater than the duration of a voltage transient at the driver circuit output, (g) a pulse reset transistor resetting node PULSE to its original low state, (h) a UPC1 reset transistor resetting node UPC1 to its original high state, and (i) a NOR gate having inputs connected to the node UPC1 and to the output of the CLK down generator and having an output connected to the counter, whereby the counter is incremented when an overshoot occurs unless the CLK down generator receives a down pulse;

negative detect circuitry detecting undershoots on the output of the driver circuit and providing an incremental pulse, the negative detect circuitry including:

(a) a node PULSE DOWN having a high state and a lower voltage state, (b) a pulse down transistor activated by an undershoot on the output of the driver circuit, the pulse down transistor switching the node PULSE DOWN from the high state to the lower voltage state, the magnitude of the lower voltage state being proportional to the magnitude of the undershoot at the driver circuit output, (c) a node UPC2 having a low and a high state, (d) a down interrogate transistor activated when the node PULSE DOWN switches from the high state to the lower voltage state, the down interrogate transistor switching the node UPC2 from the low to the high state, (e) a voltage keeper holding node UPC2 low until activation of the down interrogate transistor, (f) a pulse down reset transistor resetting node PULSE DOWN to its original high state, (g) a UPC2 reset transistor resetting node UPC2 to its original low state, and (h) a NAND gate having inputs connected to the node UPC2 and to the inverted output of the CLK down generator and having an input connected to the counter, whereby the counter is incremented when an undershoot occurs unless the CLK down generator receives a down pulse;

a counter receiving the incremental pulses from the positive detect circuitry and the negative detect circuitry, counting the incremental pulses, calculating a count, and providing an activation voltage;

a source of power;

a system ground;

a CONTROL CURRENT node;

a quantity of N-type field effect transistors connected in parallel and having control gates connected to and receiving the activation voltage from the counter, wherein the quantity of N-type field effect transistors being activated is equal to the count of the counter; the N-type transistors drawing current, through the CONTROL CURRENT node, to system ground, thereby providing a control current at the CONTROL CURRENT node for adjusting the adjustable-length transmission line for impedance matching; and a CLK down generator providing a down pulse to the counter to prevent over-adjustment of the adjustable-length transmission line.

10. The automatic, self-resetting control circuit of claim 9 further comprising:

a RESET node;

a first isolating resistive device connected between the source of internal power and the RESET node;

a second isolating resistive device connected between the system ground and the node PULSE;

a RESET2 node;

a third isolating resistive device connected between the system ground and the RESET2 node; and a fourth isolating resistive device connected between the internal power source and the node PULSE DOWN, thereby reducing the susceptibility of the control circuit to accidental switching due to system noise.

* * * * *

UNITED STATES PATENT AND TRADEMARK OFFICE
CERTIFICATE OF CORRECTION

PATENT NO. : 6,249,193 B1
DATED : June 19, 2001
INVENTOR(S) : Abadeer et al.

Page 1 of 1

It is certified that error appears in the above-identified patent and that said Letters Patent is hereby corrected as shown below:

Title page,
Item [54], delete "TERMINATION IMPEDANCE INDEPENDENT SYSTEM FOR IMPEDANCE MATCHING IN HIGH SPEED INPUT-OUTPUT CHIP INTERFACING" and insert -- TERMINATION RESISTANCE INDEPENDENT SYSTEM FOR IMPEDANCE MATCHING IN HIGH SPEED INPUT-OUTPUT CHIP INTERFACING --;

Column 2,
Line 19, delete one of the periods (.) after the word "system";

Column 6,
Line 15, Center "First Embodiment of the Present Invention", and insert a new paragraph after the word "Invention"; and Column 7,
Line 11, Center "Second Embodiment of the Present Invention", and insert a new paragraph after the word "Invention."

Signed and Sealed this

Twenty-third Day of April, 2002

Attest:

Attesting Officer

JAMES E. ROGAN
Director of the United States Patent and Trademark Office